(12) United States Patent
Takahashi

(10) Patent No.: US 7,281,554 B2
(45) Date of Patent: Oct. 16, 2007

(54) PNEUMATIC TIRE WITH TREAD HAVING BLOCKS INCLUDING HIGHLAND PORTIONS AND CONVEX SURFACE THAT IS SMOOTHLY CHAMFERED AND DEFINES LINE EDGE AT THE TOP OF BLOCK SIDEWALL

(75) Inventor: Fumio Takahashi, Tokyo (JP)

(73) Assignee: Bridgestone Corproation, Tokyo (JP)

( * ) Notice: Subject to any disclaimer, the term of this patent is extended or adjusted under 35 U.S.C. 154(b) by 75 days.

(21) Appl. No.: 10/476,703

(22) PCT Filed: May 10, 2002

(86) PCT No.: PCT/JP02/04567

§ 371 (c)(1),
(2), (4) Date: Nov. 5, 2003

(87) PCT Pub. No.: WO02/102611

PCT Pub. Date: Dec. 27, 2002

(65) Prior Publication Data

US 2005/0072505 A1    Apr. 7, 2005

(30) Foreign Application Priority Data

May 11, 2001   (JP) ............................. 2001-141646
Jul. 31, 2001   (JP) ............................. 2001-231795
Dec. 5, 2001   (JP) ............................. 2001-371236

(51) Int. Cl.
*B60C 11/11* (2006.01)

(52) U.S. Cl. ........................... 152/209.15; 152/209.16; 152/902

(58) Field of Classification Search ........... 152/209.15, 152/209.16, 209.21, 902
See application file for complete search history.

(56) References Cited

U.S. PATENT DOCUMENTS 5,343,917 A  *  9/1994  Okihara et al. ........ 152/209.18

(Continued)

FOREIGN PATENT DOCUMENTS

EP        0 652 119 A1      5/1995

(Continued)

*Primary Examiner*—Steven D. Maki
(74) *Attorney, Agent, or Firm*—Sughrue Mion, PLLC

(57) ABSTRACT

To provide a pneumatic tire in which noise can be reduced without changing the basic design of the block pattern, a chamfered portion 24 is provided at a tire widthwise-direction outer side end 18A of a leading edge 18A of a block 18. When the tire rolls and the block 18 contacts a road surface, first, with respect to the leading edge 18A, a flat portion 22 contacts the ground, and then the chamfered portion 24 contacts the ground. Because the height of the chamfered portion 24 gradually decreases towards the tire widthwise-direction outer side end, the leading edge 18A at the chamfered portion 24 gradually makes contact with the road surface, whereby force input that generates sound is dispersed in terms of input timing and it is possible to suppress the generation of noise (mainly a striking sound) at the initial state of the block 18 contacting the road surface. Furthermore, by changing the tire widthwise-direction position of the flat portion 22 in a tire circumferential direction, it is possible for the entire block to gently receive stress generated at the time of rolling, whereby it is possible to suppress the level of noise generated by the block 18 at the time the block 18 contacts the ground at a low level.

10 Claims, 32 Drawing Sheets

U.S. PATENT DOCUMENTS 5,503,208 A * 4/1996 Kamegawa et al. ... 152/209.15
5,690,761 A * 11/1997 Masaoka .................... 152/902

FOREIGN PATENT DOCUMENTS

| | | | |
|---|---|---|---|
| EP | 0 705 718 A2 | | 4/1996 |
| EP | 0 895 876 A2 | | 2/1999 |
| EP | 0 925 957 A2 | | 6/1999 |
| JP | 63-61606 | * | 3/1988 |
| JP | 63-137003 | * | 6/1988 |
| JP | 3-186405 | * | 8/1991 |
| JP | 7-186623 | * | 7/1995 |
| JP | 9-2021 A | | 1/1997 |
| JP | 9-20108 | * | 1/1997 |
| JP | 11-227420 | * | 8/1999 |
| JP | 11-334320 | * | 12/1999 |
| JP | 11-334321 | * | 12/1999 |
| JP | 2000-247110 | * | 9/2000 |
| JP | 2002-59711 A | | 2/2002 |
| JP | 2002-114011 A | | 4/2002 |
| WO | WO 03/013881 | * | 2/2003 |

* cited by examiner

|  | Ha (mm) | Ha/C | Noise Level |
|---|---|---|---|
| Conventional Example 1 | 0 | 0 | 100 |
| Example 4 | 0.1 | 0.01 | 96 |
| Example 5 | 0.2 | 0.02 | 90 |
| Example 6 | 0.5 | 0.05 | 77 |
| Example 7 | 1.0 | 0.10 | 74 |
| Example 8 | 2.0 | 0.20 | 76 |
| Example 9 | 2.5 | 0.25 | 80 |
| Example 10 | 2.5 | 0.25 | 87 |
| Example 11 | 2.7 | 0.27 | 97 |

|  | Hb (mm) | Hb/C | Noise Level |
|---|---|---|---|
| Conventional Example 1 | 0 | 0 | 100 |
| Example 12 | 0.1 | 0.01 | 98 |
| Example 13 | 0.2 | 0.02 | 89 |
| Example 14 | 0.5 | 0.05 | 77 |
| Example 15 | 1.0 | 0.10 | 75 |
| Example 16 | 2.0 | 0.20 | 81 |
| Example 17 | 2.5 | 0.25 | 86 |
| Example 18 | 2.5 | 0.25 | 90 |
| Example 19 | 2.7 | 0.27 | 92 |

|  | La (mm) | La/B | Noise Level |
|---|---|---|---|
| Conventional Example 1 | 0 | 0 | 100 |
| Example 20 | 3.0 | 0.15 | 94 |
| Example 21 | 5.0 | 0.25 | 89 |
| Example 22 | 10.0 | 0.50 | 86 |
| Example 23 | 15.0 | 0.75 | 77 |
| Example 24 | 17.0 | 0.85 | 80 |
| Example 25 | 20.0 | 1.00 | 89 |
| Example 26 | 21.0 | 1.05 | 90 |

| | Lb (mm) | Lb/A | Noise Level |
|---|---|---|---|
| Conventional Example 1 | 0 | 0 | 100 |
| Example 27 | 5.0 | 0.17 | 94 |
| Example 28 | 10.0 | 0.33 | 89 |
| Example 29 | 25.0 | 0.83 | 77 |
| Example 30 | 30.0 | 1.00 | 82 |

|  | Lc (mm) | Lc/A | Noise Level |
|---|---|---|---|
| Conventional Example 1 | 0 | 0 | 100 |
| Example 31 | 5.0 | 0.17 | 90 |
| Example 32 | 12.0 | 0.40 | 77 |
| Example 33 | 20.0 | 0.67 | 84 |
| Example 34 | 25.0 | 0.83 | 90 |
| Example 35 | 27.0 | 0.90 | 93 |

|  | Ld (mm) | Ld/B | Noise Level |
|---|---|---|---|
| Conventional Example 1 | 0 | 0 | 100 |
| Example 36 | 3.0 | 0.15 | 91 |
| Example 37 | 6.0 | 0.30 | 77 |
| Example 38 | 10.0 | 0.50 | 82 |
| Example 39 | 15.0 | 0.75 | 86 |
| Example 40 | 20.0 | 1.00 | 93 |

| | Le (mm) | Le/B | Noise Level |
|---|---|---|---|
| Conventional Example 1 | 0 | 0 | 100 |
| Example 41 | 2.0 | 0.10 | 89 |
| Example 42 | 7.0 | 0.35 | 77 |
| Example 43 | 10.0 | 0.50 | 82 |
| Example 44 | 15.0 | 0.75 | 91 |
| Example 45 | 20.0 | 1.00 | 99 |

|  | Lf (mm) | Lf/B | Noise Level |
|---|---|---|---|
| Conventional Example 1 | 0 | 0 | 100 |
| Example 46 | 2.0 | 0.10 | 84 |
| Example 47 | 7.0 | 0.35 | 77 |
| Example 48 | 10.0 | 0.50 | 83 |
| Example 49 | 15.0 | 0.75 | 86 |
| Example 50 | 20.0 | 1.00 | 86 |

PNEUMATIC TIRE WITH TREAD HAVING BLOCKS INCLUDING HIGHLAND PORTIONS AND CONVEX SURFACE THAT IS SMOOTHLY CHAMFERED AND DEFINES LINE EDGE AT THE TOP OF BLOCK SIDEWALL

TECHNICAL FIELD

The present invention relates to a pneumatic tire, and particularly to a pneumatic tire that can reduce tire noise without compromising other characteristics.

BACKGROUND ART

Tire tread patterns are provided in a tire tread from the objective of improving running performance in rain. Because most tire tread patterns have grooves that extend in circumferential and widthwise directions of the tire, land portions called blocks are formed in the tread.

However, it is known that pattern noise is generated because the blocks are provided.

Conventional technology concerning overcoming pattern noise can be largely categorized into two types.

The first type is a method in which the angle of lug grooves with respect to the tire widthwise direction is increased, in order to extend the time during which input is applied to a single block.

The second type is a method in which peaks are not given to a single frequency, by utilizing the relation with other blocks, for example, by varying the circumferential-direction lengths of the blocks or shifting phases within the same tire tread.

These technologies were mainly developed on the basis of two-dimensional conception, and their history is long.

However, with respect to automobiles in recent years in which quietness has been sought, the effects of the aforementioned conventional technology have not been sufficient. Moreover, because designs that place importance only on noise reduction using the aforementioned methods are not realistic in view of balance with other characteristics, new technology is in demand.

Particularly with respect to a single block, it has been reported that, when the angle of the lug grooves with respect to the widthwise direction of the tire is increased (i.e., when the pattern design is changed), block rigidity deteriorates as the configuration of the block becomes similar to a parallelogram which is long and thin in the circumferential direction. Further, in this case, partial wear is likely to occur.

In view of the above facts, it is an object of the present invention to provide a pneumatic tire in which noise can be reduced without changing the basic design of the block pattern.

DISCLOSURE OF THE INVENTION

The invention in aspect 1 is a pneumatic tire including a tread having plural blocks divided by plural grooves that mutually intersect, characterized in that height of each block at the leading side edge thereof varies in a tire widthwise direction, a portion of the leading side edge that initially contacts a road surface being a "highland" portion which is positioned on a tire radial-direction outer side than the remaining portion of the leading side edge that later contacts the road surface, and the highland portion extends in a tire circumferential direction and the position of the highland portion in the tire widthwise direction is changed in the tire circumferential direction.

The action of the pneumatic tire in aspect 1 will next be described.

When the pneumatic tire in aspect 1 rolls and the blocks of the tread contact the road surface, the leading edge of the block first contacts the road surface at the highland portion (i.e., the highest portion within the leading edge) that is positioned on the tire radial-direction outer side than the remaining portion thereof that later contacts the road surface, and then gradually at other portions whose height is smaller than the highland portion.

Thus, the leading edge of the block gradually makes contact with the road surface. Accordingly, as the leading edge of the block makes contact with the road surface over time, input that generates sound is dispersed in terms of input timing and it is possible to suppress the generation of noise (mainly a striking sound) at the initial stage of contact of the block with ground.

When the tire widthwise-direction position of the highland portion does not change in the tire circumferential direction, a large load is placed only on a portion of the block, whereby stress at the time of compression increases locally and the level of input is not made small.

However, in the pneumatic tire in aspect 1, because the tire widthwise-direction position of the highland portion changes in the tire circumferential direction, it is possible for the entire block to gently receive stress generated at the time of rolling, whereby it is possible to significantly suppress the level of noise generated by the block at the time the block contacts the ground.

The invention has an excellent effect in that noise can be reliably reduced in the basic tread pattern having a block configuration.

The invention in aspect 2 is a pneumatic tire including a tread having plural blocks divided by plural grooves that mutually intersect, characterized in that height of each block at the trailing side edge thereof varies in a tire widthwise direction, a portion of the trailing side edge that lastly separates from a road surface being a "highland" portion which is positioned on a tire radial-direction outer side than the remaining portion of the trailing side edge that initially separates the road surface, and the highland portion extends in a tire circumferential direction and the position of the highland portion in the tire widthwise direction is changed in the tire circumferential direction.

The action of the pneumatic tire in aspect 2 will next be described.

When the pneumatic tire in aspect 2 rolls and the blocks of the tread separate from the road surface, the low portion of the trailing edge of the block initially separates from the road surface, then a high portion of the trailing edge separates from the road surface, and lastly the highland portion (i.e., the highest portion within the trailing edge) separates from the road surface.

Thus, the trailing edge of the block gradually separates from the road surface. Accordingly, as the trailing edge of the block is separated from the road surface over time, it is possible to suppress the generation of noise at the later stage of contact of the block with ground.

When the tire widthwise direction position of the highland portion does not change in the tire circumferential direction, a large load is placed only on a portion of the block, whereby stress at the time of compression increases locally and the level of input is not made small.

However, in the pneumatic tire in aspect 2, because the tire widthwise direction position of the highland portion changes in the tire circumferential direction, it is possible for the entire block to gently receive stress generated at the time of rolling, whereby it is possible to significantly suppress the level of noise generated by the block at the time the block contacts the ground.

The invention in aspect 3 is a pneumatic tire including a tread having plural blocks divided by plural grooves that mutually intersect, wherein each of leading side edges and trailing side edges of the blocks has a height that differs in a tire widthwise direction, a portion of the leading side edge that initially contacts a road surface being a first "highland" portion which is positioned on a tire radial-direction outer side than the remaining portion of the leading side edge that later contacts the road surface, and a portion of the trailing side edge that lastly separates from a road surface being a second "highland" portion which is positioned on a tire radial-direction outer side than the remaining portion of the trailing side edge that initially separates from the road surface, and each of the first highland portion and the second highland portion extends in a tire circumferential direction and the position of the highland portion in the tire widthwise direction is changed in the tire circumferential direction.

The action of the pneumatic tire in aspect 3 will next be described.

In the pneumatic tire in aspect 3, it is possible to suppress the level of noise generated by the blocks at a further low level, due to both the action in aspect 1 and aspect 2 described above.

The invention in aspect 4 is the pneumatic tire of aspect 3, wherein the first highland portions and the second highland portions can be connected such that they are continuous in the tire circumferential direction.

The action of the pneumatic tire in aspect 4 will next be described.

Because the first highland portions and the second highland portions can be connected such that they are continuous in the tire circumferential direction, it is possible to suppress noise level at a low level during the time from when the block contacts the road surface to when the block separates from the road surface.

The invention in aspect 5 is the pneumatic tire of any one of aspects 1 to 4, wherein portions lower than the highland portions can be formed as smoothly curved surfaces whose height gradually decreases towards block edges.

The action of the pneumatic tire in aspect 5 will next be described.

By forming portions lower than the highland portions as smoothly curved surfaces whose height gradually decreases towards block edges, the tread surface makes gradual contact with (gradually separates from) the road surface, whereby it is possible to suppress the level of generated noise at a low level.

The invention in aspect 6 is the pneumatic tire of any one of aspects 1 to 5, wherein when the blocks are viewed in cross section along the tire widthwise direction, the highland portions and the portions lower than the highland portions can be provided in any cross section of portions at tire circumferential-direction positions.

The action of the pneumatic tire in aspect 6 will next be described.

Because the highland portions and the portions lower than the highland portions can be provided in any cross section of portions at tire circumferential-direction positions, it is possible to suppress noise level at a low level during the time from when the block contacts the road surface to when the block separates from the road surface.

The invention in aspect 7 is the pneumatic tire of any one of aspects 1 to 6, wherein in a tread surface of the blocks, the highland portions can include flat portions that coincide with an outer contour configuration of the tire.

The action of the pneumatic tire in aspect 7 will next be described.

When the highland portion includes the flat portion that coincides with the outer contour configuration of the tire, it is possible to prevent the block compression amount from increasing, at the same load, due to the three-dimensionalization of the block surface, as compared.

Namely, when a block in which the highland portion is not flat is compared to a block in which the highland portion includes a flat portion that coincides with the tire outer contour configuration, the block in which the highland portion is not flat is a block in which the chamfered portion is large (herein the block is seen as a cubic block), and the block including the flat portion is a block in which the chamfered portion is small (herein the block is seen as a cubic block), so that the volume of the block in which the highland portion is not flat is smaller than that of the block that includes the flat portion.

For this reason, when the same load is applied to each of the blocks, the amount of compression of the block in which the highland portion is not flat becomes greater than that of the block that includes the flat portion. When a load is applied to the blocks, the blocks are deformed into a barrel shape, and when the amount of compression is increased, the tendency for the blocks to be deformed into the barrel shape is encouraged. As a result, there is an increase in local stress (or deformation) near groove bottoms at block ends.

This indicates the deteriorated state of the input. However, it is possible to suppress an excessive increase in the amount of compression of the blocks by providing, as needed, the flat portion. As a result, it is possible to suppress worsening of the noise associated with excessive compression.

The invention in aspect 8 is the pneumatic tire of aspect 7, wherein in the block edges in the tire circumferential direction, a tire widthwise direction dimension of the flat portion is preferably in a range of 3 mm to 15 mm (inclusive of 3 mm and 15 mm).

The action of the pneumatic tire in aspect 8 will next be described.

In the block edges in the tire circumferential direction, when the tire widthwise dimension of the flat portion is less than 3 mm, it becomes impossible to sufficiently reduce the level of noise.

Additionally, in the block edges in the tire circumferential direction, when the widthwise dimension of the flat portion exceeds 15 mm, it becomes impossible to sufficiently reduce the level of noise.

Thus, in the block edges in the tire circumferential direction, it is preferable to set the tire widthwise dimension of the flat portion to be in a range of 3 mm to 15 mm.

The invention in aspect 9 is the pneumatic tire of aspect 7 or aspect 8, wherein in the block edges in the tire circumferential direction, the tire widthwise-direction dimension of the flat portion is preferably 0.15 to 0.75 times a tire widthwise-direction dimension of the block edges.

The action of the pneumatic tire in aspect 9 will next be described.

In the block edges in the tire circumferential direction, when the tire widthwise-direction dimension of the flat portion is less than 0.15 times the tire widthwise-direction dimension of the block edges, it becomes impossible to sufficiently reduce the level of noise.

Additionally, in the block edges in the tire circumferential direction, when the tire widthwise-direction dimension of the flat portion is greater than 0.75 times the tire widthwise-direction dimension of the block edges, it becomes impossible to sufficiently reduce the level of noise.

Thus, in the block edges in the tire circumferential direction, it is preferable to set the tire widthwise-direction dimension of the flat portion to be 0.15 to 0.75 times the tire widthwise-direction dimension of the block edges.

The invention in aspect 10 is the pneumatic tire of any one of aspects 1 to 9, wherein in the block edges in the tire circumferential direction, a depth dimension in a block height direction from a highest portion of the highland portion to a lowest portion of the tread surface is preferably within a range of 0.1 mm to 2.5 mm (inclusive of 0.1 mm and 2.5 mm).

The action of the pneumatic tire in aspect 10 will next be described.

In the block edges in the tire circumferential direction, when the depth dimension in a block height direction from a highest portion of the highland portion to a lowest portion of the tread surface is less than 0.1 mm, it becomes impossible to sufficiently reduce the level of noise.

Additionally, in the block edges in the tire circumferential direction, when the depth dimension in a block height direction from a highest portion of the highland portion to a lowest portion of the tread surface exceeds 2.5 mm, it becomes impossible to sufficiently reduce the level of noise.

Thus, in the block edges in the tire circumferential direction, it is preferable to set the depth dimension in a block height direction from a highest portion of the highland portion to a lowest portion of the tread surface to be within in a range of 0.1 mm to 2.5 mm.

The invention in aspect 11 is the pneumatic tire of any one of aspects 1 to 10, wherein in the block edges in the tire circumferential direction, the depth dimension in the block height direction from the highest portion of the highland portion to the lowest portion of the tread surface is preferably 0.01 to 0.25 times a maximum height of the highland portion.

The action of the pneumatic tire in aspect 11 will next be described.

In the block edges in the tire circumferential direction, when the depth dimension in the block height direction from the highest portion of the highland portion to the lowest portion of the tread surface is less than 0.01 times a maximum height of the highland portion, it becomes impossible to sufficiently reduce the level of noise.

Additionally, in the block edges in the tire circumferential direction, when the depth dimension is greater than 0.25 times a maximum height of the highland portion, it becomes impossible to sufficiently reduce the level of noise.

Thus, in the block edges in the tire circumferential direction, it is preferable to set the depth dimension in the block height direction from the highest portion of the highland portion to the lowest portion of the tread surface to be 0.01 to 0.25 times a maximum height of the highland portion.

The invention in aspect 12 is the pneumatic tire of any one of aspects 1 to 11, wherein in the block edges in the tire circumferential direction, a tire widthwise-direction length of the portions lower than the highland portions is preferably 5 mm to 17 mm.

The action of the pneumatic tire in aspect 12 will next be described.

In the block edges in the circumferential direction, when the tire widthwise-direction length of the portion lower than the highland portion is less than 5 mm, it becomes impossible to sufficiently reduce the level of noise.

Additionally, in the block edges in the tire circumferential direction, when the tire widthwise-direction length of the portion lower than the highland portion exceeds 17 mm, it becomes impossible to sufficiently reduce the level of noise.

Thus, in the block edges in the tire circumferential direction, it is preferable to set the tire widthwise-direction length of the portion lower than the highland portion to be 5 mm to 17 mm.

The invention in aspect 13 is the pneumatic tire of any one of aspects 1 to 12, wherein in the block edges in the tire circumferential direction, the tire widthwise-direction length of the portions lower than the highland portions is preferably 0.25 to 0.85 times the tire widthwise-direction dimension of the block edges.

The action of the pneumatic tire in aspect 13 will next be described.

In the block edges in the tire circumferential direction, when the tire widthwise-direction length of the portion lower than the highland portion is less than 0.25 times the tire widthwise-direction dimension of the block edges, it becomes impossible to sufficiently reduce the level of noise.

Additionally, in the block edges in the tire circumferential direction, when the tire widthwise-direction length of the portion lower than the highland portion is greater than 0.85 times the tire widthwise-direction dimension of the block edges, it becomes impossible to sufficiently reduce the level of noise.

The invention in aspect 14 is the pneumatic tire of any one of aspects 1 to 13, wherein in the block edges in the tire circumferential-direction of blocks disposed at places other than on a tire equatorial plane of the tread, highland portions are disposed at a tire equatorial plane side.

The action of the pneumatic tire in aspect 14 will next be described.

When seen in cross section along the tire rotational axis, the outer contour con-figuration of the tread is a substantially circular arc shape having a large radius of curvature.

For example, when a pneumatic tire provided with blocks in which the height of the leading edges thereof is constant in the tire widthwise direction rolls, because the leading edges of blocks disposed at places other than on the tire equatorial plane, in a state of just before making contact with the road surface, slant in the direction in which the tire equatorial plane side thereof nears the road surface, the leading edges begin contacting the ground from the tire equatorial plane side.

If the highland portion at the leading edge is disposed at the side opposite from the tire equatorial plane side, there are cases in which, due to the vertical difference between the highland portion and the low portion and to the impact of the radius of curvature of the crown portion of the tread, the leading edge becomes parallel to the road surface at the time it makes contact with the road surface, the trailing edge becomes parallel to the road surface at the time it separates from the road surface, contact is made with the road surface initially by the low portion of the leading edge, or the low portion of the trailing edge lastly separates from the road surface, whereby it becomes impossible to reduce the level of noise.

In the pneumatic tire in aspect 14, in the edges in the tire circumferential direction of blocks disposed at places other than on the tire equatorial plane of the tread, because the highland portions are disposed at the tire equatorial plane side, it is reliably possible for contact with the road surface to be made from the highland portion of the leading edge of the block in a pneumatic tire provided with the highland portion and the low portion at the leading edge of the block, and it is reliably possible for the highland portion of the trailing edge of the block to lastly separate from the road surface in a pneumatic tire provided with the highland portion and the low portion at the trailing edge of the block. Thus, it is possible to reliably reduce the level of noise.

The invention in aspect 15 is a pneumatic tire including a tread having plural blocks divided by plural circumferential grooves extending in the tire circumferential direction and plural grooves that intersect the circumferential grooves, characterized in that, at end edges on the tire equatorial plane side, of blocks at outermost sides in a tire widthwise direction, highland portions along a tire outer contour are disposed at one of a leading side end edge and a trailing side end edge, and first lowland portions whose block height gradually becomes lower in a direction of moving away from the highland portions are disposed at the other of the leading side end edge and the trailing side end edge, and at ground-contact ends of the blocks at the outermost sides in the tire widthwise direction, all are highland portions along the tire outer contour.

The action of the pneumatic tire in aspect 15 will next be described.

First, with respect to an ordinary shoulder block 100 shown in FIG. 30, in which the height of the shoulder block 100 is constant, there is provided a ground-contact region 102 (hatched portion) defined by dimensions A and B (it should be noted that reference numeral 104 denotes a ground-contact end, the direction of arrow L and the direction of arrow R denote a tire widthwise direction, and the direction of arrow A denotes the direction in which the tire rotates).

The ground-contact region 102 represents the state of the region immediately before the ground-contact region makes contact with the ground. In actuality, when the shoulder block 100 receives input or when the input is released at the time the ground-contact region 102 makes contact with or separates from a road surface, contact and separation are conducted gradually in the circumferential direction.

Noise input is large at a portion that fluctuates dynamically large. Thus, such a portion is important in terms of reducing noise.

A leading side end edge 100A of the shoulder block 100 defined by dimension B receives an impact of the contact shape with which the block makes contact, and contact with the ground is carried out at roughly the same time in the tire widthwise direction, in a case where the tread surface of the shoulder block 100 is flat. Thus, a force having a single large peak is transmitted via the end edge to the tire and becomes input of a vibrating noise.

In the blocks at outermost sides in a tire widthwise direction in aspect 15, in the end edges on the tire equatorial plane side, first lowland portions whose block height gradually becomes lower are disposed at the other of the leading side end edge and the trailing side end edge.

For this reason, block height gradually increases, from the end edges on the tire equatorial plane side towards the tire widthwise-direction outer side, at the leading side end edge or trailing side end edge provided with the first lowland portions.

Thus, when the first lowland portion is provided at the leading side of the end edge on the tire equatorial plane side, the leading edge makes gradual contact with the road surface at the time of making contact. Therefore, it is possible to make the input per unit time of the peak force resulting from deformation (in kicking-in) prolonged for as long as the time required for the input. In this manner, it is possible to suppress the level of noise generated by the tire widthwise-direction outermost side blocks at a low level.

In a case in which the first lowland portion is disposed at the trailing side of the end edge located on the tire equatorial plane side, the trailing edge gradually separates from the road surface at the time of separation. Therefore, it is possible to make the input per unit time of the peak force resulting from deformation (in kicking-off) prolonged for as long as the time required for the input. In this manner, it is possible to suppress the level of noise generated by the tire widthwise-direction outermost side blocks at a low level.

In the tire widthwise-direction outermost side blocks, because all of the ground-contact ends on the outer side in the tire widthwise-direction are highland portions along the tire outer contour, it is possible to maximize the vertical difference of the ground-contact portion at the leading edge or the trailing edge, and it is possible to maximally prolong the time required for one end to the other end, of the leading edge or the trailing edge, to make contact with the ground (or the time required for the one end to the other end to separate from the ground).

It should be noted that the ground-contact end referred to herein is that observed when a pneumatic tire is placed on a standard rim stipulated in the JATMA Year Book (Japan Automobile Tyre Manufacturer's Association standard, 2001 Edition) and the tire is filled to an internal pressure of 100% of the air pressure (maximum air pressure) corresponding to the maximum load capability (bolded load in the internal pressure-load capability correspondence chart) in the applied size ply rating of the JATMA Year Book, to bear the maximum load capability.

When the TRA standard or the ETRTO standard is applied in the use sites or manufacture sites, the respective standard is followed.

The invention in aspect 16 is a pneumatic tire including a tread having plural blocks divided by plural grooves that mutually intersect, characterized in that highland portions along a tire outer contour and second lowland portions that are lower than the highland portions and whose block height gradually becomes lower in a direction of moving away from the highland portions are disposed at a leading side edge or a trailing side edge of blocks at outermost sides in a tire widthwise direction.

The action of the pneumatic tire in aspect 16 will next be described.

According to the pneumatic tire in aspect 16, because highland portions along a tire outer contour and second lowland portions that are lower than the highland portions and whose block height gradually becomes lower in a direction of moving away from the highland portions are disposed at a leading side edge or a trailing side edge of blocks at outermost sides in a tire widthwise direction, it is possible to make the input per unit time of the peak force resulting from deformation (in kicking-in or kicking-off) prolonged for as long as the time required for the input. In this manner, it is possible to suppress the level of noise generated by the tire widthwise-direction outermost side blocks at a low level.

The invention in aspect 17 is a pneumatic tire including a tread having plural blocks divided by plural grooves that mutually intersect, characterized in that, at end edges, of the tire equatorial plane side, of blocks at outermost sides in a tire widthwise direction, highland portions along a tire outer contour are disposed at one of a leading side end edge and a trailing side end edge, and first lowland portions whose block height gradually becomes lower in a direction of moving away from the highland portions are disposed at the other of the leading side end edge and the trailing side end edge, and highland portions along a tire outer contour and second lowland portions that are lower than the highland portions and whose block height gradually becomes lower in a direction of moving away from the highland portions are disposed at the leading side edge or the trailing side edge of the blocks at the outermost sides in the tire widthwise direction not provided with the first lowland portions.

The action of the pneumatic tire in aspect 17 will next be described.

In the pneumatic tire in aspect 17, because the first lowland portion is disposed at one of the leading side and the trailing side of the end edge on the tire equatorial plane side and the second lowland portion is disposed at the other of the leading side end edge and the trailing side end edge, it is possible to make the inputs of the peak forces resulting from deformations both in kicking-in and kicking-off, continuous in the direction of the direction of the "time" axis (i.e., both the action in aspect 1 and aspect 2), whereby it is possible to suppress the level of noise generated by the tire widthwise-direction outermost side blocks at a low level.

The invention in aspect 18 is the pneumatic tire of aspect 15 or 17, wherein in the end edges, on the tire equatorial plane side, of the blocks at outermost sides in the tire widthwise direction, when Ha denotes a depth dimension in a block height direction from a highest portion of the highland portion to a lowest portion of the first lowland portion, Ha is preferably 0.2 mm to 2.5 mm.

The action of the pneumatic tire in aspect 18 will next be described.

By setting Ha to be 0.2 mm to 2.5 mm, it is possible to sufficiently reduce the noise level.

The invention in aspect 19 is the pneumatic tire of any one of aspects 15, 17 and 18, wherein in the end edges on the tire equatorial plane side, of the blocks at outermost sides in the tire widthwise direction, when Ha denotes a depth dimension in a block height direction from a highest portion of the highland portion to a lowest portion of the first lowland portion and C denotes block height in the end edges, on the tire equatorial plane side, of the blocks at outermost sides in the tire widthwise direction, Ha/C is preferably 0.02 to 0.25.

The action of the pneumatic tire in aspect 19 will next be described.

By setting Ha/C to be 0.02 to 0.25, it is possible to sufficiently reduce the noise level.

The invention in aspect 20 is the pneumatic tire of aspect 16 or aspect 17, wherein in the leading side edge or trailing side edge provided with the second lowland portion, when Hb denotes a depth dimension in a block height direction from a highest portion of the highland portion to a lowest portion of the second lowland portion, Hb is preferably 0.2 mm to 2.5 mm.

The action of the pneumatic tire in aspect 20 will next be described.

By setting Hb to be 0.2 mm to 2.5 mm, it is possible to sufficiently reduce the noise level.

The invention in aspect 21 is the pneumatic tire of any one of aspects 16, 17 and 20, wherein in the leading side edge or trailing side edge provided with the second lowland portion, when Hb denotes a depth dimension in a block height direction from a highest portion of the highland portion to a lowest portion of the second lowland portion and C denotes block height in the end edge on the tire equatorial plane side, of the blocks at outermost sides in the tire widthwise direction, Hb/C is preferably 0.02 to 0.25.

The action of the pneumatic tire in aspect 21 will next be described.

By setting Hb/C to be 0.02 to 0.25, it is possible to sufficiently reduce the noise level.

The invention in aspect 22 is the pneumatic tire of any one of aspects 15, 17, 18 and 19, wherein when La denotes a dimension of the first lowland portion measured from the end edge on the tire equatorial plane side towards the tire widthwise-direction outer side, dimension La is preferably 5 mm or greater.

The action of the pneumatic tire in aspect 22 will next be described.

By setting La to be 5 mm or greater, it is possible to sufficiently reduce the noise level.

The invention in aspect 23 is the pneumatic tire of any one of aspects 15, 17, 18, 19 and 22, wherein when La denotes a dimension of the first lowland portion measured from the end edge on the tire equatorial plane side towards the tire widthwise-direction outer side and B denotes a dimension of the block at the outermost side in the tire widthwise direction measured from the end edge on the tire equatorial plane side to the ground-contact edge on the tire widthwise-direction outer side, La/B is preferably 0.25 or greater.

The action of the pneumatic tire in aspect 23 will next be described.

By setting La/B to be 0.25 or greater, it is possible to sufficiently reduce the noise level.

The invention in aspect 24 is the pneumatic tire of any one of aspects 15, 17, 18, 19, 22 and 23, wherein when Lb denotes a dimension of the first lowland portion measured along the tire circumferential direction from the leading side edge or trailing side edge provided with the first lowland portion, Lb is preferably 10 mm or greater.

The action of the pneumatic tire in aspect 24 will next be described.

By setting Lb to be 10 mm or greater, it is possible to sufficiently reduce the noise level.

The invention in aspect 25 is the pneumatic tire of any one of aspects 15, 17, 18, 19, 22, 23 and 24, wherein when Lb denotes a dimension of the first lowland portion measured along the tire circumferential direction from the leading side edge or trailing side edge provided with the first lowland portion and A denotes a dimension of the end edge on the tire equatorial plane side measured along the tire circumferential direction, Lb/A is preferably 0.3 or greater.

The action of the pneumatic tire in aspect 25 will next be described.

By setting Lb/A to be 0.3 or greater, it is possible to sufficiently reduce the noise level.

The invention in aspect 26 is the pneumatic tire of any one of aspects 16, 17, 20 and 21, wherein when P1 denotes a tire circumferential-direction outermost end of the second lowland portion furthest from the leading side edge or trailing side edge provided with the second lowland portion in the tire circumferential direction and Lc denotes a dimension measured along the tire circumferential direction from the tire circumferential-direction outermost end P1 to the leading side edge or trailing side edge provided with the second lowland portion, Lc is preferably 2 mm to 25 mm.

The action of the pneumatic tire in aspect 26 will next be described.

By setting Lc to be 2 mm to 25 mm, it is possible to sufficiently reduce the noise level.

The invention in aspect 27 is the pneumatic tire of any one of aspects 16, 17, 20, 21 and 26, wherein when P1 denotes a tire circumferential-direction outermost end of the second lowland portion furthest from the leading side edge or trailing side edge provided with the second lowland portion, Lc denotes a dimension measured along the tire circumferential direction from the tire circumferential-direction outermost end P1 to the leading side edge or trailing side edge provided with the second lowland portion, and A denotes a dimension of the end edge on the tire equatorial plane side measured along the tire circumferential direction, Lc/A is preferably 0.17 to 0.83.

The action of the pneumatic tire in aspect 27 will next be described.

By setting Lc/A to be 0.17 to 0.83, it is possible to sufficiently reduce the noise level.

The invention in aspect 28 is the pneumatic tire of any one of aspects 16, 17, 20, 21, 26 and 27, characterized in that, in the leading side edge or trailing side edge of the block at the outermost side in the tire widthwise direction provided with the second lowland portion, when Ld denotes a dimension measured along the tire widthwise direction from an end portion, of the block, on the tire equatorial plane side to the second lowland, Ld is preferably 3 mm to 15 mm.

The action of the pneumatic tire in aspect 28 will next be described.

By setting Ld to be 3 mm to 15 mm, it is possible to sufficiently reduce the noise level.

The invention in aspect 29 is the pneumatic tire of any one of aspects 16, 17, 20, 21, 26, 27 and 28, wherein in the leading side edge or trailing side edge of the block at the outermost side in the tire widthwise direction provided with the second lowland portion, when Ld denotes a dimension measured along the tire widthwise direction from an end portion, of the block, on the tire equatorial plane side to the second lowland and B denotes a dimension of the block at the outermost side in the tire widthwise direction measured, along the tire widthwise direction, from the end edge on the tire equatorial plane side to the ground-contact edge on the tire widthwise-direction outer side, Ld/B is preferably 0.15 to 0.75.

The action of the pneumatic tire in aspect 29 will next be described.

By setting Ld/B to be 0.15 to 0.75, it is possible to sufficiently reduce the noise level.

The invention in aspect 30 is the pneumatic tire of any one of aspects 16, 17, 20, 21, 26, 27, 28 and 29, wherein when P1 denotes a tire circumferential-direction outermost end of the second lowland portion furthest from the leading side edge or trailing side edge provided with the second lowland portion, P2 denotes an intersection between the leading side edge or trailing side edge provided with the second lowland portion and an imaginary straight line FL that passes through the tire circumferential-direction outermost end P1 along the tire circumferential direction, and Le denotes a dimension measured along the tire widthwise direction from the intersection P2 to the end portion on the tire equatorial plane side of the second lowland portion, Le is preferably 2 mm to 15 mm.

The action of the pneumatic tire in aspect 30 will next be described.

By setting Le to be 2 mm to 15 mm, it is possible to sufficiently reduce the noise level.

The invention in aspect 31 is the pneumatic tire of any one of aspects 16, 17, 20, 21, 26, 27, 28, 29 and 30, wherein when P1 denotes a tire circumferential-direction outermost end of the second lowland portion furthest from the leading side edge or trailing side edge provided with the second lowland portion, P2 denotes an intersection between the leading side edge or trailing side edge provided with the second lowland portion and an imaginary straight line FL that passes through the tire circumferential-direction outermost end P1 along the tire circumferential direction, Le denotes a dimension measured along the tire widthwise direction from the intersection P2 to the end portion on the tire equatorial plane side of the second lowland portion, and B denotes a dimension of the block at the outermost side in the tire widthwise direction measured, in the widthwise direction, from the end edge on the tire equatorial plane side to the ground-contact edge on the tire widthwise-direction outer side, Le/B is preferably 0.1 to 0.75.

The action of the pneumatic tire in aspect 31 will next be described.

By setting Le/B to be 0.1 to 0.75, it is possible to sufficiently reduce the noise level.

The invention in aspect 32 is the pneumatic tire of any one of aspects 16, 17, 20, 21, 26, 27, 28, 29, 30 and 31, wherein when P1 denotes a tire circumferential-direction outermost end of the second lowland portion furthest from the leading side edge or trailing side edge provided with the second lowland portion, P2 denotes an intersection between the leading side edge or trailing side edge provided with the second lowland portion and an imaginary straight line FL that passes through the tire circumferential-direction outermost end P1 along the tire circumferential direction, and Lf denotes a dimension measured along the tire widthwise direction from the intersection P2 to the tire widthwise-direction outer side end of the second lowland portion, Lf is preferably 2 mm or greater.

The action of the pneumatic tire in aspect 32 will next be described.

By setting Lf to be 2 mm or greater, it is possible to sufficiently reduce the noise level.

The invention in aspect 33 is the pneumatic tire of any one of aspects 16, 17, 20, 21, 26, 27, 28, 29, 30, 31 and 32, wherein when P1 denotes a tire circumferential-direction outermost end of the second lowland portion furthest from the leading side edge or trailing side edge provided with the second lowland portion, P2 denotes an intersection between the leading side edge or trailing side edge provided with the second lowland portion and an imaginary straight line FL that passes through the tire circumferential-direction outermost end P1 along the tire circumferential direction, Lf denotes a dimension measured along the tire widthwise direction from the intersection P2 to the tire widthwise-direction outer side end of the second lowland portion, and B denotes a dimension of the block at the outermost side in the tire widthwise direction measured, in the tire widthwise direction, from the end edge on the tire equatorial plane side to the ground-contact edge on the tire widthwise-direction outer side, Lf/B is preferably 0.1 or greater.

The action of the pneumatic tire in aspect 33 will next be described.

By setting Lf/B to be 0.1 or greater, it is possible to sufficiently reduce the noise level.

The invention in aspect 34 is the pneumatic tire of any one of aspects 15 to 33, wherein when the block at the outermost side in the tire widthwise direction is viewed in cross section along the tire widthwise direction, the highland portion and the lowland portion are provided in any portion in the tire circumferential direction, in a cross-sectional view.

The action of the pneumatic tire in aspect 34 will next be described.

By setting the tread surface configuration so that the highland portion and the lowland portion are provided in any portion in the tire circumferential direction when the block at the outermost side in the tire widthwise direction is viewed in cross section along the tire widthwise direction, it is possible to make the input per unit time of the peak force resulting from deformation prolonged from the time contact is initiated to the time when separation is completed. In this manner, it is possible to suppress the level of noise generated by the tire widthwise-direction outermost side block at an even lower level.

The invention in aspect 35 is the pneumatic tire of any one of aspects 15 to 34, wherein in the block at the outermost side in the tire widthwise direction, the highland portion includes a flat portion that coincides with a tire outer contour configuration.

The action of the pneumatic tire in aspect 35 will next be described.

Three-dimensionalization of the tread surface of the block significantly changes ground-contact characteristics and changes the characteristics of the block. When three-dimensionalization of the tread surface becomes excessive, i.e., when there is no flat portion coinciding with the tire outer contour configuration on the tread surface, it becomes impossible to reduce the noise level.

DETAILED DESCRIPTION OF THE EMBODIMENTS

First Embodiment

A first embodiment of the invention will be described in detail below with reference to the drawings.

Figure 2:
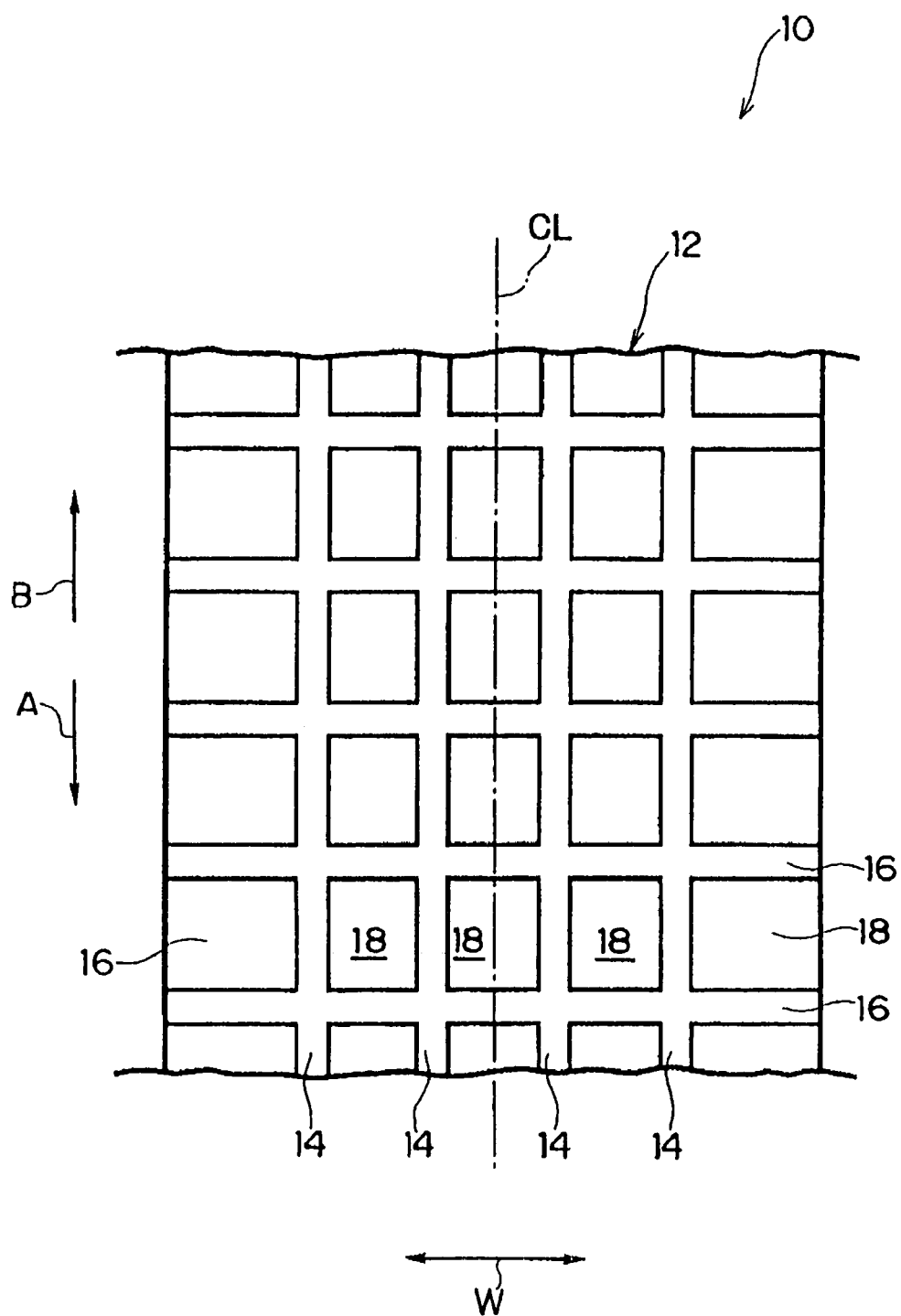
FIG. 2 is a plan view of a tread of the pneumatic tire relating to the first embodiment.

As shown in FIG. 2, a plurality of rectangular blocks 18 are provided on a tread 12 of a pneumatic tire 10 by dividing the tread 12 by plural circumferential-direction grooves 14 that extend along a tire circumferential direction (the direction of arrow A and the direction of arrow B) and by plural lug grooves 16 that intersect the circumferential-direction grooves 14 and extend along a tire widthwise direction (the directions of arrow W).

It should be noted that the pneumatic tire 10 rotates in the direction of arrow A when the vehicle moves forward.

Figure 1:
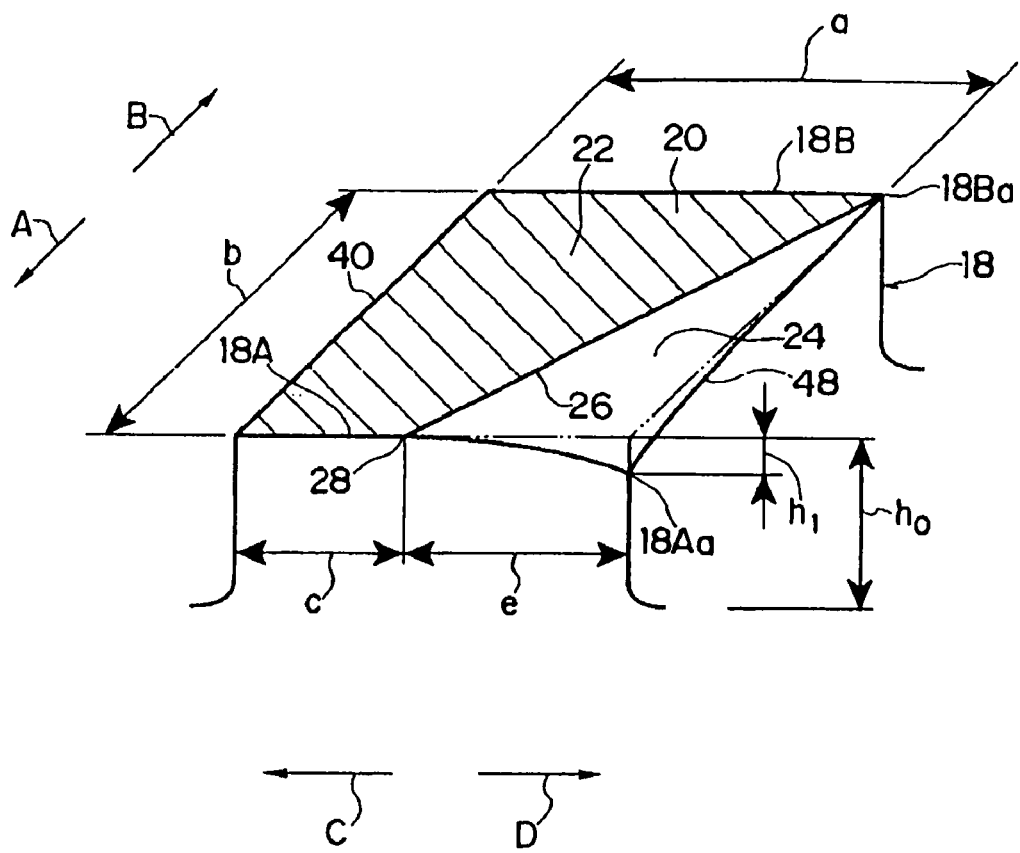
FIG. 1 is a perspective view of a block of a pneumatic tire relating to a first embodiment.

As shown in FIG. 1, a tread surface 20 of the blocks 18 includes a flat portion 22 (hatched portion in the drawing) that coincides with a tire (tread) outer contour configuration.

In FIG. 1, reference numeral 18A denotes a leading edge of the block 18, and reference numeral 18B denotes a trailing edge of the block 18. When the pneumatic tire 10 rolls on a road surface, the block 18 contacts the road surface initially by the leading edge 18A and separates from the road surface lastly by the trailing edge 18B.

In the block 18 of the present embodiment, the height of the trailing edge 18B (measured from a groove bottom) is constant, but the height of the leading edge 18A differs in the tire widthwise direction.

A chamfered portion 24 is formed at a corner portion at a tire widthwise-direction outer side (direction of arrow D side) of the leading edge 18A of the block 18 (it should be noted that the block 18 shown in FIG. 1 is a block 18 positioned to the right side of a tire equatorial plane CL of FIG. 2).

Figure 3:
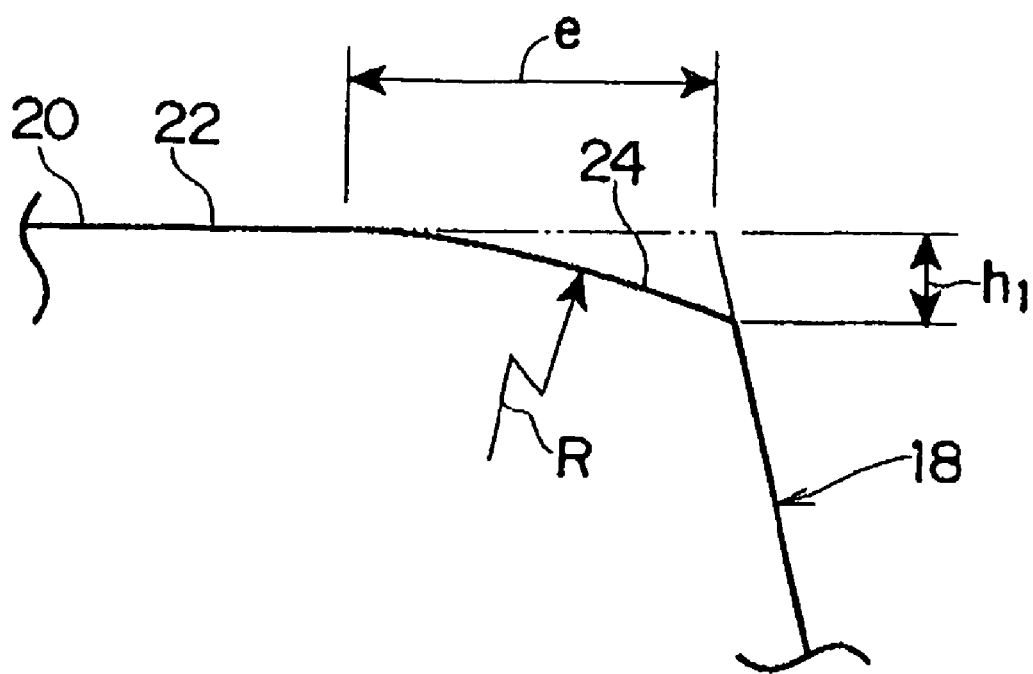
FIG. 3 is a cross-sectional view of the block.

As shown in FIG. 3, the chamfered portion 24 has a surface that curves (in the present embodiment, an arc having a curvature radius R) convexly towards the tire outer side and smoothly connects with the flat portion 22.

As shown in FIG. 1, a border 26 between the chamfered portion 24 and the flat portion 22 lies on a straight line that connects a point 28 located at the leading edge 18A and distanced by a dimension e from a tire widthwise-direction outer-side end 18Aa of the leading edge 18A towards the tire equatorial plane (direction of arrow C), with a tire widthwise-direction outer side end 18Ba of the trailing edge 18B. The height of the chamfered portion 24 gradually decreases from the border 26 towards the tire widthwise-direction outer side end 18Aa of the leading edge 18A. Namely, the tire widthwise-direction outer side end 18Aa of the leading edge 18A becomes the lowest portion of the leading edge 18A.

Reference letter a in FIG. 1 denotes the dimension of the block 18 in the tire width-wise direction (tire widthwise-direction lengths of the leading edge 18A and the trailing edge 18B, i.e., edges arranged in the circumferential direction), reference letter b denotes the dimension of the block 18 in the tire circumferential direction (tire circumferential-direction lengths of edges 40 and 48 arranged in the widthwise-direction), reference letter $h_0$ denotes the height of the block 18 (height of the flat portion 22), reference letter e denotes the tire widthwise-direction dimension of the chamfered portion 24 at the leading edge 18A, reference letter $h_1$ denotes the depth from the flat portion 22 (plane) to the lowest portion of the chamfered portion 24 (in the present embodiment, the tire widthwise-direction outer side end 18Aa), and reference letter c denotes the tire widthwise-direction dimension of the flat portion (highland portion) at the leading edge 18A.

(Action)

The action of the pneumatic tire 10 of the present embodiment will next be described.

When the pneumatic tire 10 rolls and the blocks 18 contact the road surface, first, with respect to the leading edge 18A, the flat portion 22 contacts the ground, and then the chamfered portion 24 contacts the ground. Because the height of the chamfered portion 24 gradually decreases towards the tire widthwise-direction outer side end, the leading edge 18A at the chamfered portion 24 gradually makes contact with the road surface.

Namely, because all of the leading edge 18A of the block 18 does not make immediate contact with the road surface but rather gradually contacts the road surface, force input that generates sound is dispersed in terms of input timing and it is possible to suppress the generation of noise (mainly a striking sound) when the block 18 initially contacts the road surface.

Furthermore, because the tire widthwise-direction dimension of the flat portion 22 changes in the tire circumferential direction, i.e., because the tire widthwise-direction position of the flat portion 22 changes in the tire circumferential direction, it is possible for the entire block to gently receive stress generated at the time of rolling, whereby it is possible to suppress the level of noise generated by the block 18 at the time the block 18 contacts the ground at a low level.

It should be noted that, when the tire widthwise-direction dimension c of the flat portion 22 at the leading edge 18A falls below 3 mm, it becomes impossible to sufficiently reduce the noise level.

Additionally, when the tire widthwise-direction dimension c of the flat portion 22 at the leading edge 18A exceeds 15 mm, it becomes impossible to sufficiently reduce the noise level.

Therefore, it is preferable to set the tire widthwise-direction dimension c of the flat portion 22 at the leading edge 18A to be 3 mm to 15 mm.

Also, when the dimension c is less than 0.15 times the dimension a, it becomes impossible to sufficiently reduce the noise level.

Additionally, when the dimension c is greater than 0.75 times the dimension a, it becomes impossible to sufficiently reduce the noise level.

Therefore, it is preferable to set the dimension c to be 0.15 to 0.75 times the dimension a.

Also, when the depth $h_1$ is less than 0.1 mm, it becomes impossible to sufficiently reduce the noise level.

Additionally, when the depth $h_1$ exceeds 2.5 mm, it becomes impossible to sufficiently reduce the noise level.

Therefore, it is preferable to set the depth $h_1$ to be 0.1 mm to 2.5 mm.

Also, with respect to the leading edge 18A, when the depth $h_1$ is less than 0.01 times the height $h_0$ of the flat portion 22, it becomes impossible to sufficiently reduce the noise level.

Additionally, when the depth $h_1$ is greater than 0.25 times the height $h_0$ of the flat portion 22, it becomes impossible to sufficiently reduce the noise level.

Also, when the tire widthwise-direction dimension e of the chamfered portion 24 at the leading edge 18A is less than 5 mm, it becomes impossible to sufficiently reduce the noise level.

Additionally, when the dimension e exceeds 17 mm, it becomes impossible to sufficiently reduce the noise level.

Also, when the dimension e is less than 0.25 times the dimension a, it becomes impossible to sufficiently reduce the noise level.

Additionally, when the dimension e is greater than 0.85 times the dimension a, it becomes impossible to sufficiently reduce the noise level.

Second Embodiment

A second embodiment of the invention will next be described in detail. It should be noted that the same reference numerals will be given to structures that are the same as those in the preceding embodiment and that description of those structures will be omitted.

The present embodiment is an example in which the pneumatic tire 10 of the first embodiment is reversed when put on a vehicle (i.e., the direction of arrow B in FIG. 1 is the direction in which the tire rotates when the vehicle moves forward).

Namely, in the second embodiment, the portion that was the leading edge 18A in the first embodiment becomes the trailing edge, and the portion that was the trailing edge 18B in the first embodiment becomes the leading edge.

In the present embodiment, when the trailing edge of the block 18 separates from the road surface, the chamfered portion 24 of the trailing edge separates from the road surface at first, and then the flat portion 22 of the trailing edge separates from the road surface.

That is, the trailing edge does not separate from the road surface all at once but gradually. Therefore, it is possible to suppress the noise level when the block 18 separates from the road surface at a low level.

Third Embodiment

A third embodiment of the invention will next be described in detail. It should be noted that the same reference numerals will be given to structures that are the same as those in the preceding embodiments and that description of those structures will be omitted.

Figure 4:
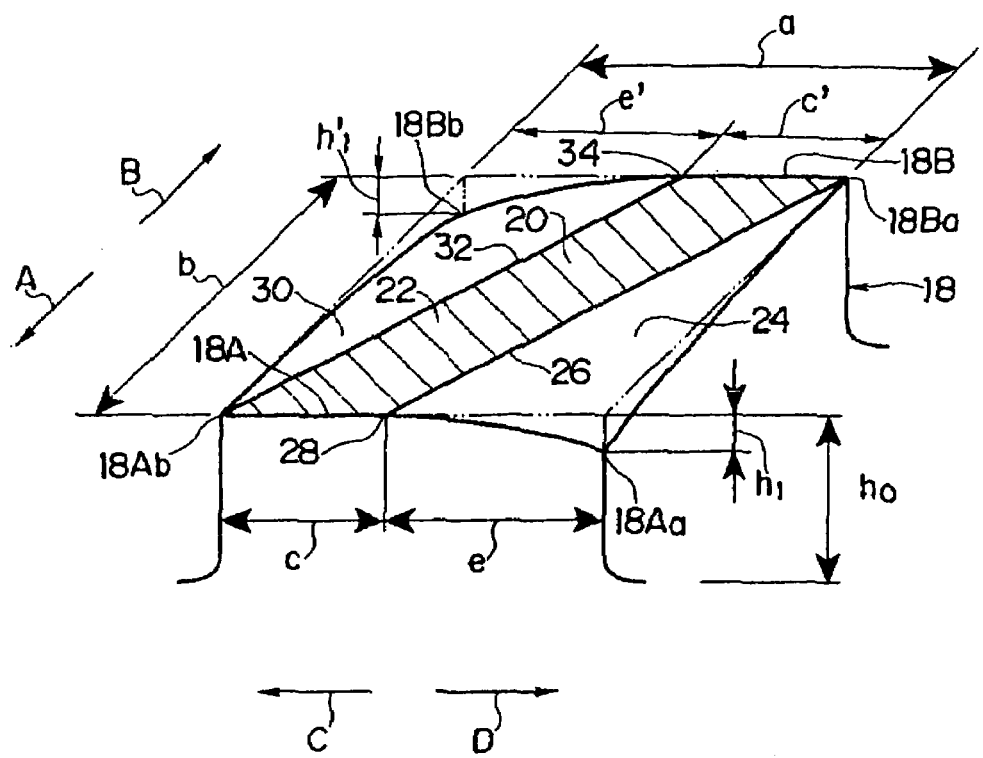
FIG. 4 is a perspective view of a block of a pneumatic tire relating to a third embodiment.

As shown in FIG. 4, in the block 18 of the present embodiment, a chamfered portion 30 that is the same as the chamfered portion 24 is formed at the tire equatorial plane side (direction of arrow C side) of the trailing edge 18B.

A border 32 between the chamfered portion 30 and the flat portion 22 lies on a straight line that connects a point 34 located at the trailing edge 18B and distanced by a dimension e' from a tire equatorial plane side end 18Bb of the trailing edge 18B towards the tire widthwise-direction outer side, with a tire equatorial plane side end 18Ab of the leading edge 18A. The height of the chamfered portion 30 gradually decreases from the border 32 towards the tire equatorial plane side end 18Bb of the trailing edge 18B. Namely, the tire equatorial plane side end 18Bb of the trailing edge 18B becomes the lowest portion of the trailing edge 18B.

Namely, in the present embodiment, the chamfered portion structure of the first embodiment is combined with the chamfered portion structure of the second embodiment, and it is possible to suppress both the level of noise generated when the blocks 18 contact the road surface and the level of noise generated when the blocks 18 separate from the road surface at low levels, whereby the noise level of the tire can be suppressed even more lowly.

Fourth Embodiment

A fourth embodiment of the invention will next be described in detail. It should be noted that the same reference numerals will be given to structures that are the same as those in the preceding embodiments and that description of those structures will be omitted.

Figure 5:
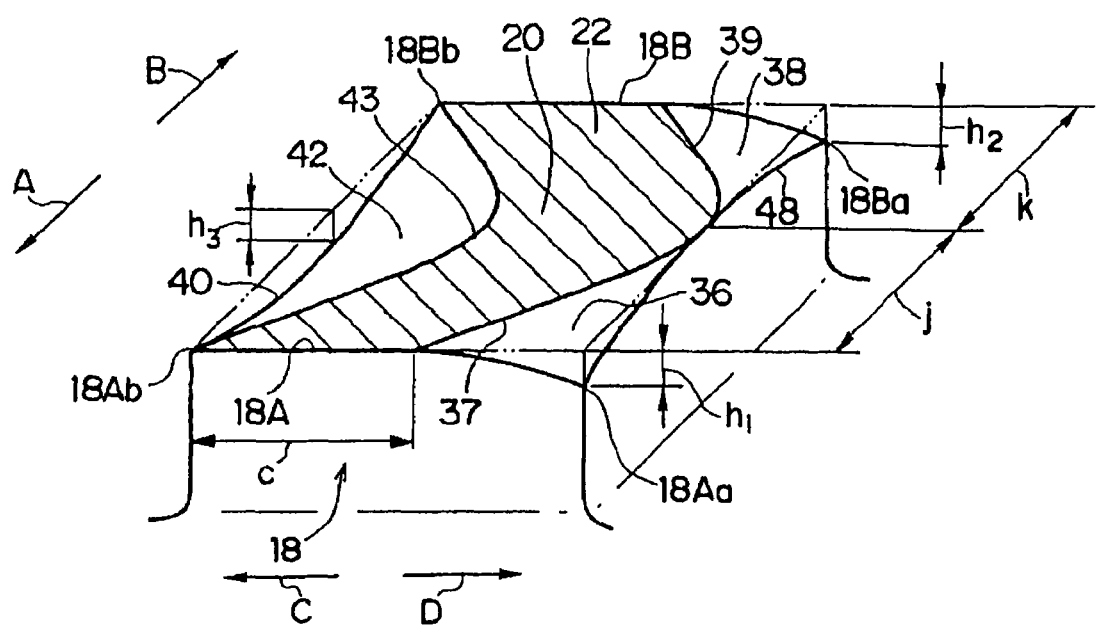
FIG. 5 is a perspective view of a block of a pneumatic tire relating to a fourth embodiment.

As shown in FIG. 5, in the block 18 of the present embodiment, a chamfered portion 36 is formed at the tire widthwise-direction outer side of the leading edge 18A, a chamfered portion 38 is formed at the tire widthwise-direction outer side of the trailing edge 18B, and a chamfered portion 42 is formed at the tire equatorial plane side edge 40, whereby the entire flat portion 22 curves in a substantially circular arc.

It should be noted that the tire widthwise-direction outer side end 18Aa of the leading edge 18A is the lowest portion of the chamfered portion 36, and that the height of the chamfered portion 36 gradually decreases from a border 37 between the flat portion 22 and the chamfered portion 36 towards the tire widthwise direction outer side end 18Aa.

Similarly, the tire widthwise-direction outer side end 18Ba of the trailing edge 18B is the lowest portion of the chamfered portion 38, and the height of the chamfered portion 38 gradually decreases from a border 39 between the flat portion 22 and the chamfered portion 38 towards the tire widthwise-direction outer side end 18Bb.

Also, the longitudinal-direction center portion of the tire equatorial plane side edge 40 is the lowest portion of the chamfered portion 42, and the height of the chamfered portion 42 gradually decreases from a border 43 between the flat portion 22 and the chamfered portion 42 towards the longitudinal-direction center of the edge 40.

In the present embodiment also, it is possible to suppress both the level of noise generated when the blocks 18 contact the road surface and the level of noise generated when the blocks 18 separate from the road surface at low levels, whereby the noise level of the tire can be suppressed even more lowly.

Fifth Embodiment

A fifth embodiment of the invention will next be described in detail. It should be noted that the same reference numerals will be given to structures that are the same as those in the preceding embodiments and that description of those structures will be omitted.

Figure 6:
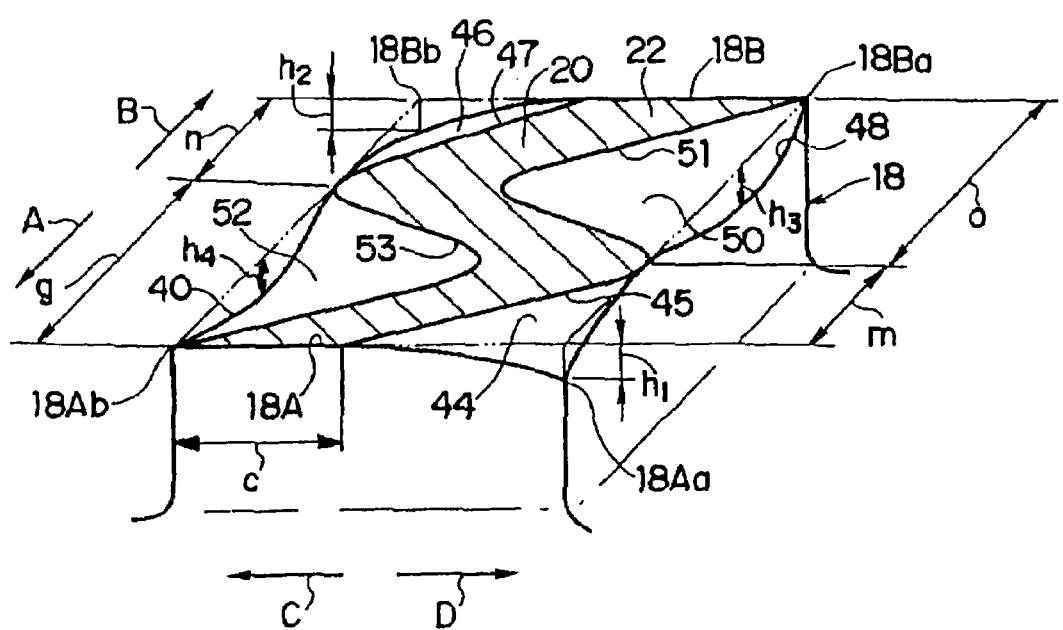
FIG. 6 is a perspective view of a block of a pneumatic tire relating to a fifth embodiment.

As shown in FIG. 6, in the block 18 of the present embodiment, a chamfered portion 44 is formed at the tire widthwise-direction outer side of the leading edge 18A, a chamfered portion 46 is formed at the tire equatorial plane outer side of the trailing edge 18B, a chamfered portion 50 is formed at the trailing edge 18B side of the tire widthwise-direction outer side edge 48, and a chamfered portion 52 is formed at a leading edge 18A side of the tire equatorial plane side edge 40, whereby the entire flat portion 22 curves in a substantial S-shape.

It should be noted that the tire widthwise-direction outer side end 18Aa of the leading edge 18A is the lowest portion of the chamfered portion 44, and that the height of the chamfered portion 44 gradually decreases from a border 45 between the flat portion 22 and the chamfered portion 44 towards the tire widthwise-direction outer side end 18Aa.

The tire equatorial plane side end 18Bb of the trailing edge 18B is the lowest portion of the chamfered portion 46, and the height of the chamfered portion 46 gradually decreases from a border 47 between the flat portion 22 and the chamfered portion 46 towards the tire widthwise-direction outer side end 18Bb.

The circumferential-direction center portion of the chamfered portion 50 is the lowest portion of the chamfered portion 50 at the tire widthwise-direction outer side edge 48, and the height of the chamfered portion 50 gradually decreases from a border 51 between the flat portion 22 and the chamfered portion 50 towards the circumferential-direction center of the chamfered portion 50 of the edge 48.

Also, the circumferential-direction center portion of the chamfered portion 52 is the lowest portion of the chamfered portion 52 provided at the tire equatorial plane side edge 40, and the height of the chamfered portion 52 gradually decreases from a border 53 between the flat portion 22 and the chamfered portion 52 towards the circumferential-direction center of the chamfered portion 52 of the edge 40.

In the present embodiment also, it is possible to suppress both the level of noise generated when the blocks 18 contact the road surface and the level of noise generated when the blocks 18 separate from the road surface at low levels, whereby the noise level of the tire can be suppressed even more lowly.

Sixth Embodiment

A sixth embodiment of the invention will next be described in detail. It should be noted that the same reference numerals will be given to structures that are the same as those in the preceding embodiments and that description of those structures will be omitted.

Figure 7:
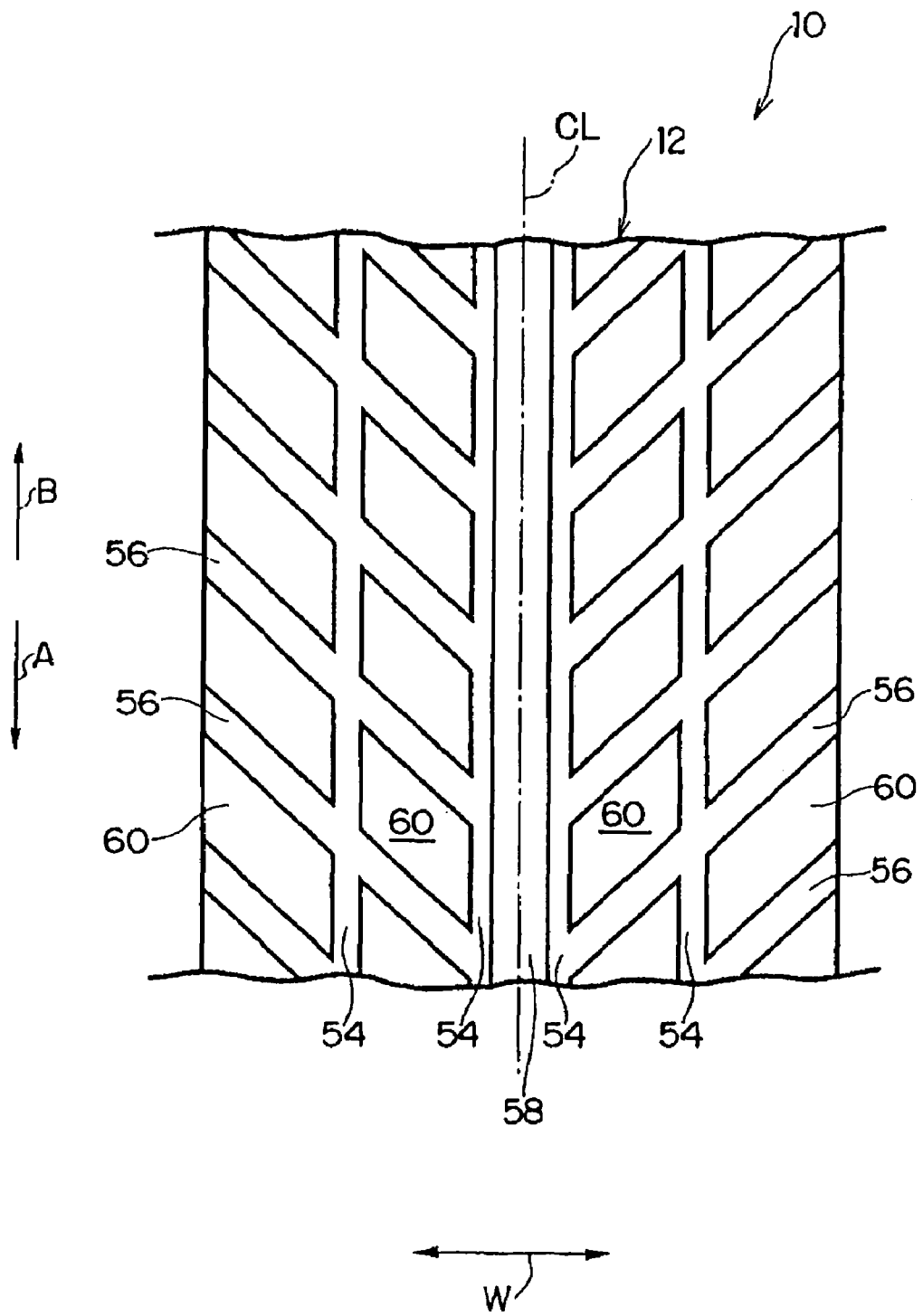
FIG. 7 is a plan view of a tread of a pneumatic tire relating to a sixth embodiment.

As shown in FIG. 7, a rib 58 is provided on the tire equatorial plane CL, and parallelogrammatic blocks 60 are provided at both sides of the rib 58, by dividing the tread 12 of the pneumatic tire 10 by plural circumferential-direction grooves 54 that extend along the tire circumferential direction (the direction of arrow A and the direction of arrow B) and by plural slanted grooves 56 that extend in the tire widthwise direction from the circumferential-direction grooves 54 and slant with respect to the tire widthwise direction.

It should be noted that the pneumatic tire 10 rotates in the direction of arrow A when the vehicle moves forward.

Figure 8:
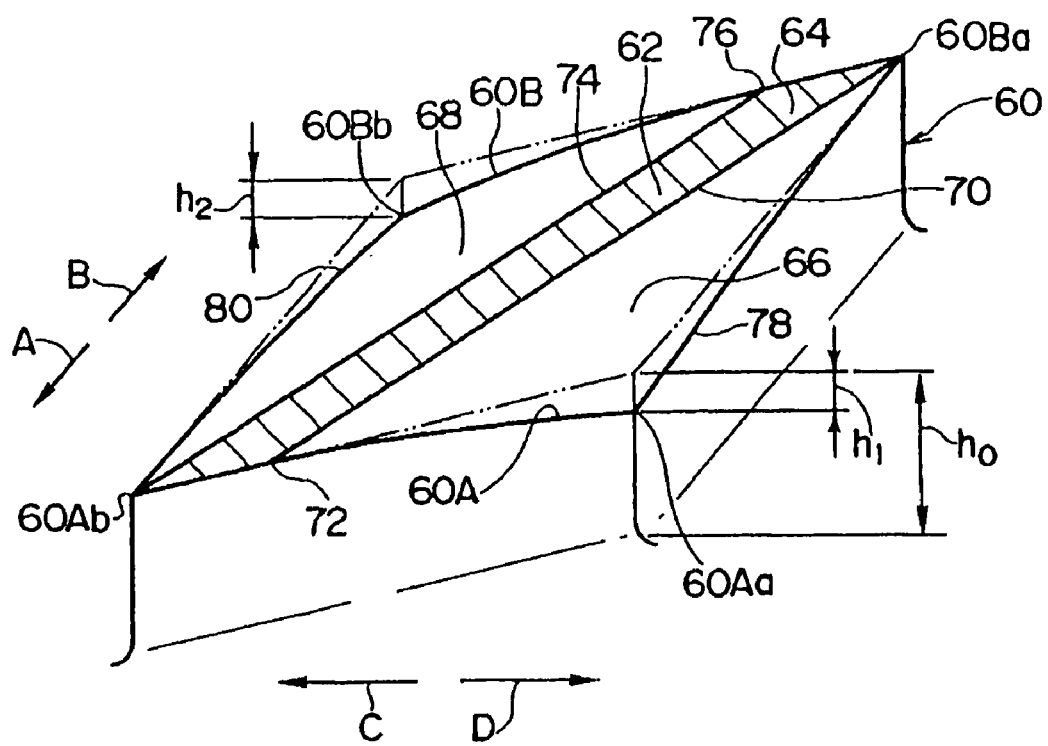
FIG. 8 is a perspective view of a block of the pneumatic tire relating to the sixth embodiment.
Figure 9:
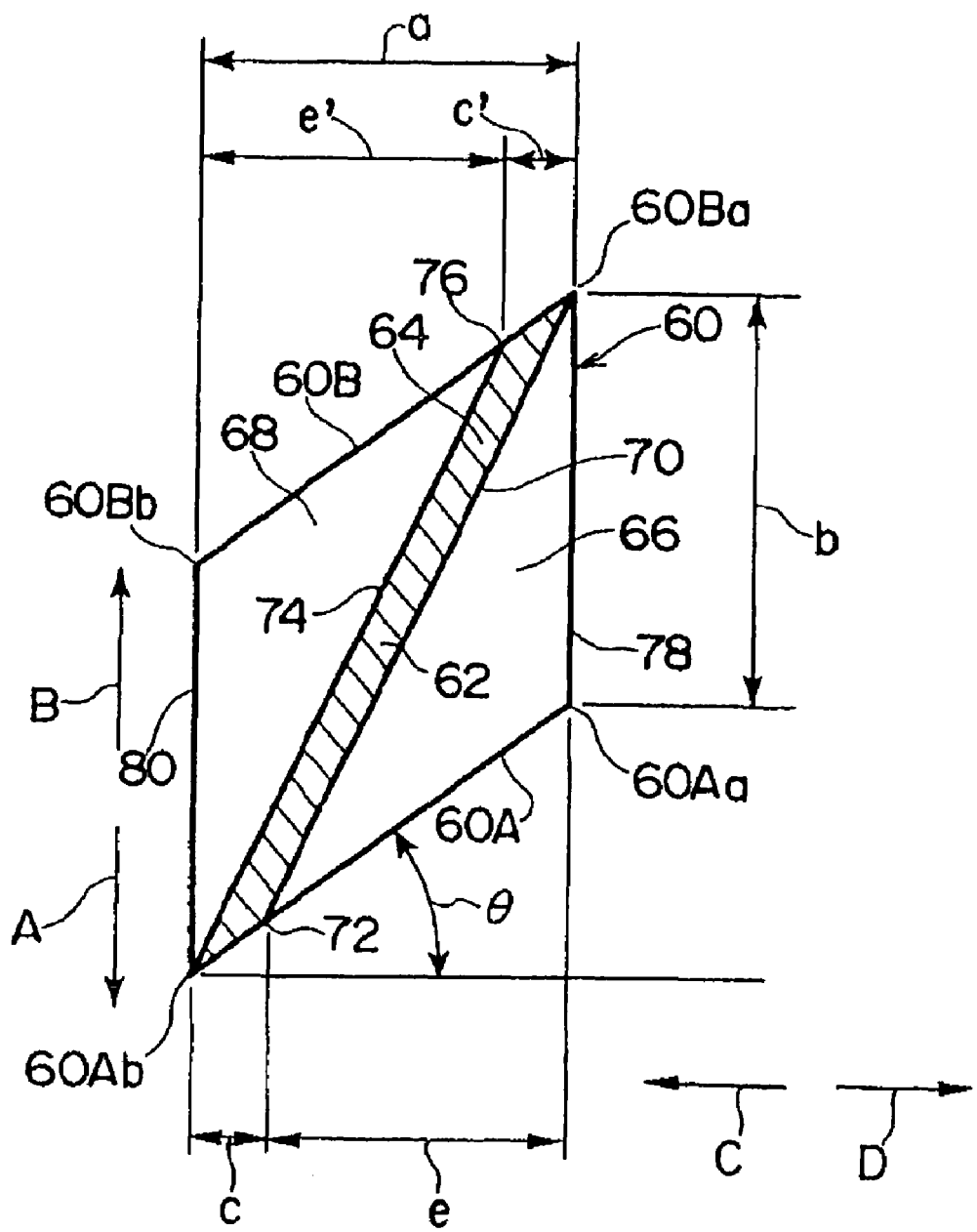
FIG. 9 is a plan view of the block of the pneumatic tire relating to the sixth embodiment.

As shown in FIGS. 8 and 9, a tread surface 62 of the block 60 includes a flat portion (hatched portion in the drawings) 64 that coincides with a tire outer contour configuration.

In the drawings, reference numeral 60A denotes a leading edge of the block 60, and reference numeral 60B denotes a trailing edge of the block 60. When the pneumatic tire 10 rolls on a road surface, the block 60 contacts the road surface initially by the leading edge 60A and separates from the road surface lastly by the trailing edge 60B.

In the block 60 of the present embodiment, each of the height of the trailing edge 60B and the height of the leading edge 60A differs in the tire widthwise direction.

A chamfered portion 66 is formed at a corner portion at the tire widthwise-direction outer side (direction of arrow D side) of the leading edge 60A, and a chamfered portion 68 is formed at a corner portion at the tire equatorial plane side of the trailing edge 60B.

The chamfered portion 66 and the chamfered portion 68 are curved surfaces that smoothly connect with the flat portion 64.

A border 70 between the chamfered portion 66 and the flat portion 64 lies on a straight line that connects a point 72 located at the leading edge 60A and distanced by a dimension c from a tire equatorial plane side end 60Ab of the leading edge 60A towards the tire widthwise direction outer side, with a tire widthwise-direction outer side end 60Ba of the trailing edge 18B. The height of the chamfered portion 66 gradually decreases from the border 70 towards a tire widthwise-direction outer side end 60Aa of the leading edge 60A. Namely, the tire widthwise-direction outer side end 60Aa of the leading edge 60A becomes the lowest portion of the leading edge 60A.

A border 74 between the chamfered portion 68 and the flat portion 64 lies on a straight line that connects a point 76 located at the trailing edge 60B and distanced by a dimension c' from a tire widthwise direction outer side end 60Ba of the trailing edge 60B towards the tire equatorial plane side, with a tire equatorial plane side end 60Ab of the leading edge 60A. The height of the chamfered portion 68 gradually decreases from the border 74 towards a tire equatorial plane side end 60Bb of the trailing edge 60B. Namely, the tire equatorial plane side end 60Bb of the trailing edge 60B becomes the lowest portion of the trailing edge 60B.

In FIGS. 8 and 9, reference letter a denotes the dimension of the block 60 in the tire widthwise direction (i.e., tire widthwise-direction dimension of the leading edge 60A and the trailing edge 60B), reference letter b denotes the circumferential direction dimension of edges 78 and 80 of the block 60 arranged in the tire widthwise direction, reference letter $h_0$ denotes the height of the block 60, reference letter e denotes the tire widthwise-direction length of the chamfered portion 66 at the leading edge 60A, reference letter $h_1$ denotes the depth from the flat portion 64 (plane) to the lowest portion of the chamfered portion 66 (in the present embodiment, the tire widthwise-direction outer side end 60Aa), reference letter c denotes the tire widthwise-direction dimension of the flat portion (highland portion) at the leading edge 60A, reference letter e' denotes the tire widthwise-direction length of the chamfered portion 68 at the trailing edge 60B, reference letter $h_2$ denotes the depth from the flat portion 64 (plane) to the lowest portion of the chamfered portion 68 (in the present embodiment, the tire equatorial plane side end 60Bb), reference letter c' denotes the tire widthwise-direction dimension of the flat portion (highland portion) at the trailing edge 60B, and angle θ denotes the angle of the slanted grooves 56 with respect to the tire widthwise direction.

In the present embodiment also, the leading edge 60A of the block 60 gradually makes contact with the ground, and the trailing edge 60B of the block 60 gradually separates from the road surface. Furthermore, because the position of the flat portion 64 changes in the tire widthwise direction, it is possible to suppress the level of noise generated by the block 18 at a low level.

TEST EXAMPLE 1

First, three types of pneumatic tires for conventional example were prepared, and noise was measured using an indoor drum tester. The test measured sound pressure (peaks of sound pressure waveforms) in the vicinity of the sides of the test tires at a speed of 80 km/hour.

Tire of Conventional Example 1 a tire including a tread provided with rectangular blocks in which the tread surface was flat (along the tire outer contour configuration) and having no chamfered portions formed thereon. The tread pattern was the same as the pattern of FIG. 2. With respect to the three rows of blocks at the center, the dimension b was 30 mm, the dimension a was 20 mm, and the height $h_0$ was 10 mm. With respect to the shoulder blocks, the dimension b was 30 mm, the dimension a was 50 mm, and the height $h_0$ was 10 mm.

Figure 10:
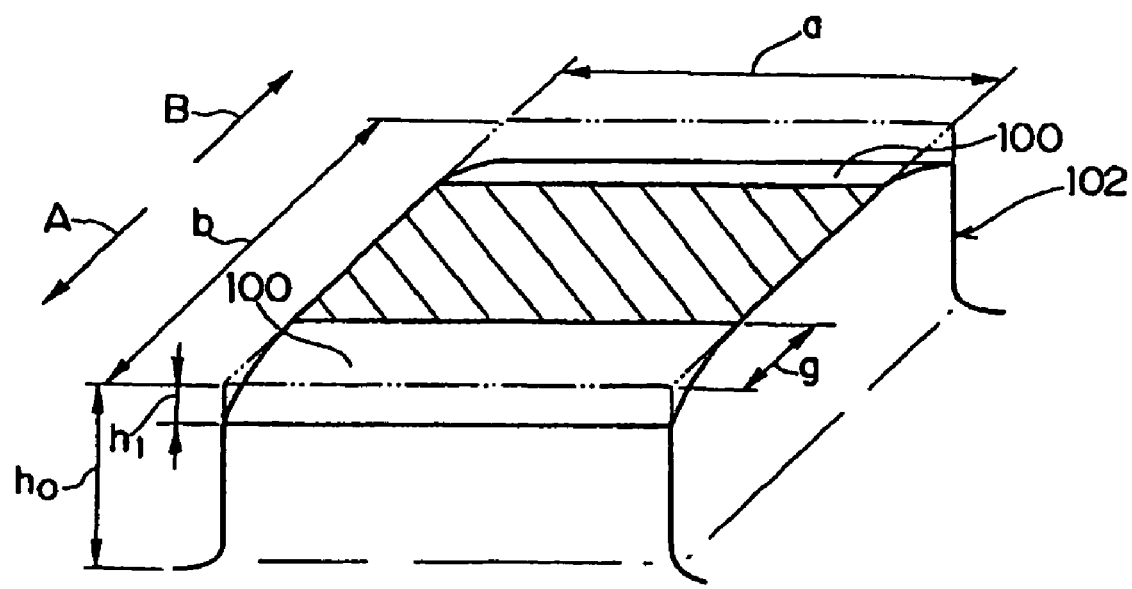
FIG. 10 is a perspective view of a block of a pneumatic tire of Conventional Example 1.

Tire of Conventional Example 2 a tire including a tread provided with, as shown in FIG. 10, blocks 102 in which the tire circumferential-direction center portion thereof was flat (hatched portion) and the tire circumferential-direction sides (leading edge and trailing edge) thereof were chamfered as chamfered portions 100. With respect to the chamfered portions 100, the length in the circumferential direction was 10 mm and the depth $h_1$ was 0.5 mm. The tread pattern and the outer shape dimension of the blocks 100 were the same as in Conventional Example 1.

Figure 11:
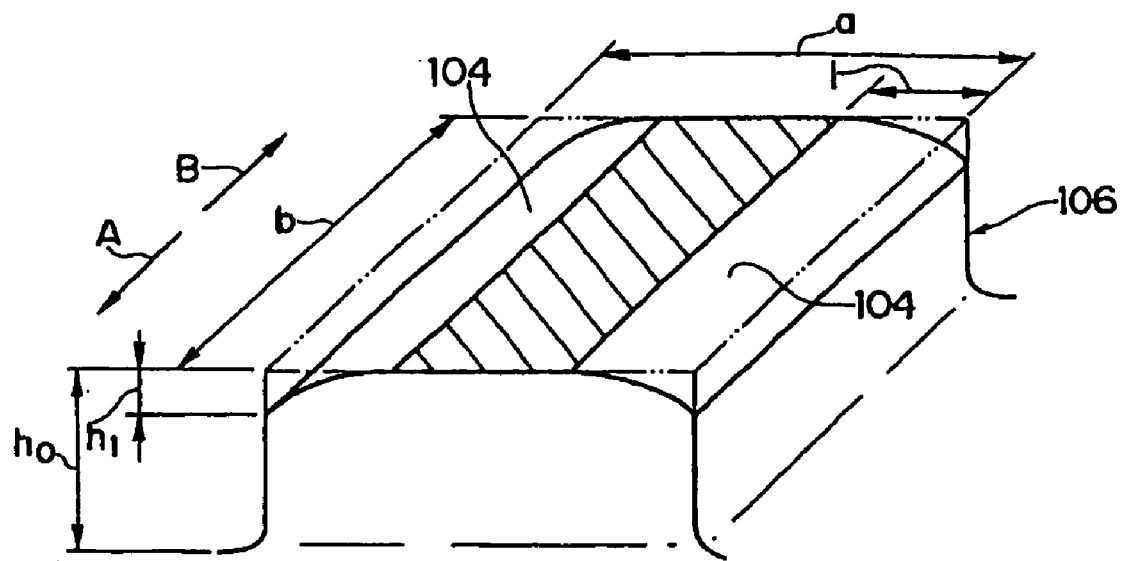
FIG. 11 is a perspective view of a block of a pneumatic tire of Conventional Example 2.

Tire of Conventional Example 3 a tire including a tread provided with, as shown in FIG. 11, blocks 106 in which the tire circumferential-direction center portion thereof was flat (hatched portion) and the tire widthwise-direction sides thereof were chamfered as chamfered portions 104. With respect to the chamfered portions 104, the length i in the tire widthwise direction was 6 mm and the depth $h_1$ was 0.5 mm. The tread pattern and the outer shape dimension of the blocks 106 were the same as in Conventional Example 1.

The sizes of the test tires were all 195/65R14.

Evaluation was conducted using an index display in which the size of the sound pressure waveform peak of the pneumatic tire of Conventional Example 1 was set at 100. The smaller the numerical value, the lower was the noise level, indicating that the amount of noise generated was suppressed at a low level.

TABLE 1

|  | Noise Level Index |
| --- | --- |
| Conventional Example 1 | 100 |
| Conventional Example 2 | 115 |
| Conventional Example 3 | 103 |

It will be understood from the test results that simply disposing chamfered portions at the blocks as in Conventional Examples 2 and 3 only resulted in increasing noise.

TEST EXAMPLE 2

In order to verify the effects of the invention, the pneumatic tire of Conventional Example 1 and a pneumatic tire of Example 1, to which the invention was applied, were prepared. A test was conducted in the same manner as in Test Example 1, and noise was evaluated.

Pneumatic Tire of Example 1 the pneumatic tire of the preceding first embodiment, with the outer shape dimension of the blocks being the same as that of Conventional Example 1. The tire widthwise-direction length e of the chamfered portion in the leading edge was 17 mm in the three rows of blocks in the center and 17 mm in the shoulder blocks. The depth $h_1$ of the chamfered portion was 0.5 mm.

The sizes of the test tires were both 195/65R14.

TABLE 2

|  | Noise Level Index |
| --- | --- |
| Conventional Example 1 | 100 |
| Example 1 | 94 |

It will be understood from the results of the test that noise level was suppressed more lowly in the pneumatic tire of Example 1, to which the invention was applied, than in the pneumatic tire of Conventional Example 1.

TEST EXAMPLE 3

In order to verify the effects of the invention, the pneumatic tire of the conventional example 1 and a pneumatic tire of Example 2, to which the invention was applied, were prepared. A test was conducted in the same manner as in Test Example 1, and noise was evaluated.

Pneumatic Tire of Example 2 the pneumatic tire of the preceding second embodiment. The outer shape dimension of the blocks was the same as that of Conventional Example 1. The tire widthwise-direction length e of the chamfered portion in the trailing edge was 17 mm in the three rows of blocks in the center and 17 mm in the shoulder blocks. The depth $h_1$ of the chamfered portion was 0.5 mm.

The sizes of the test tires were both 195/65R14.

TABLE 3

|  | Noise Level Index |
| --- | --- |
| Conventional Example 1 | 100 |
| Example 2 | 93 |

It will be understood from the results of the test that noise level was suppressed more lowly in the pneumatic tire of Example 2, to which the invention was applied, than in the pneumatic tire of Conventional Example 1.

TEST EXAMPLE 4

In order to verify the effects of the invention, the pneumatic tire of the conventional example 1 and a pneumatic tire of Example 3, to which the invention was applied, were prepared. A test was conducted in the same manner as in Test Example 1, and noise was evaluated.

Pneumatic Tire of Example 3 the pneumatic tire of the preceding third embodiment. The outer shape dimension of the blocks was the same as that of Conventional Example 1, and the dimensions of the chamfered portions were the same as those in Examples 1 and 2.

The sizes of the test tires were both 195/65R14.

TABLE 4

|  | Noise Level Index |
| --- | --- |
| Conventional Example 1 | 100 |
| Example 3 | 91 |

It will be understood from the results of the test that noise level was suppressed more lowly in the pneumatic tire of Example 3, to which the invention was applied, than in the pneumatic tire of Conventional Example 1. Moreover, noise level was suppressed more lowly in the pneumatic tire of Example 3 than in the pneumatic tires of Examples 1 and 2.

TEST EXAMPLE 5

In order to verify the effects of the invention, the pneumatic tire of the conventional example 1 and pneumatic tires of Examples 4 to 8, to which the invention was applied, were prepared. A test was conducted in the same manner as in Test Example 1, and noise was evaluated.

Figure 12:
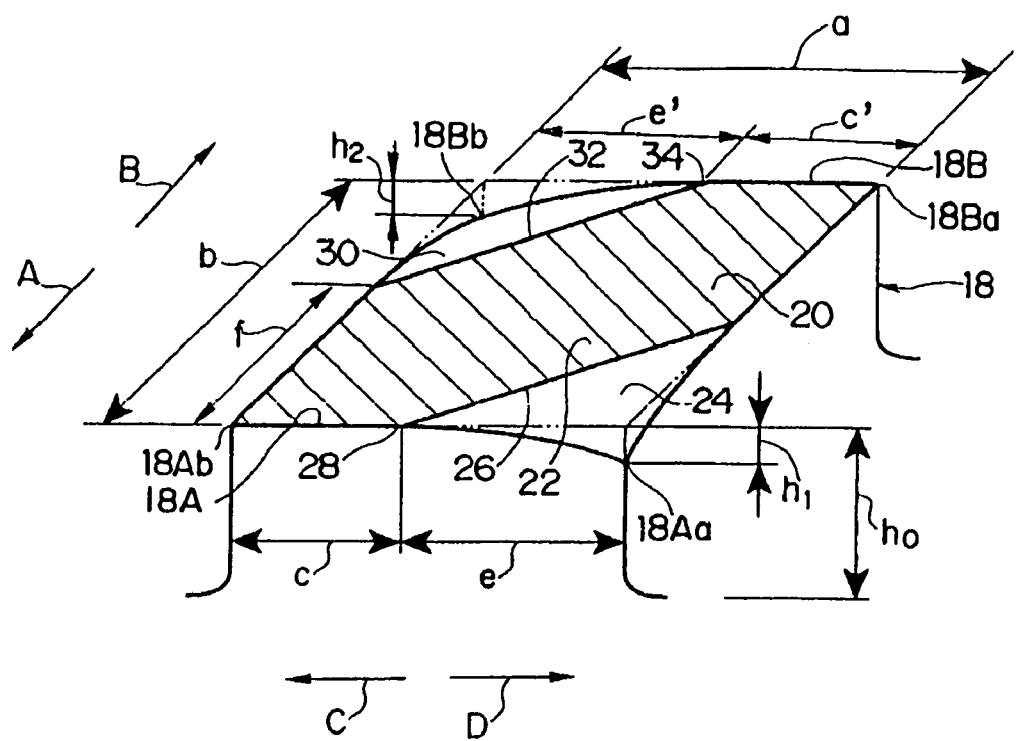
FIG. 12 is a perspective view of a block of a pneumatic tire of Example 20.

Pneumatic tires of Examples 4 to 8: as shown in FIG. 12, a chamfered portion was provided at each of the leading edge and the trailing edge, and the circumferential-direction length f of the flat portion at the tire equatorial plane side edge and at the tire widthwise-direction outer side edge was varied as shown in Table 5 below.

The pattern and outer shape dimension of the blocks were the same as those in Conventional Example 1. Also, the tire widthwise-direction length e of the chamfered portion 24 at the leading edge 18A was 17 mm in the three rows of blocks in the center and 17 mm in the shoulder blocks. The depth $h_1$ of the chamfered portion 24 was 0.5 mm.

Moreover, the tire widthwise-direction length e' of the chamfered portion 30 at the trailing edge 18B was 17 mm in the three rows of blocks in the center and 17 mm in the shoulder blocks. The depth $h_2$ of the chamfered portion 30 was 0.5 mm.

The sizes of the test tires were all 195/65R14.

TABLE 5

|  | f (mm) | Noise Level Index |
| --- | --- | --- |
| Example 4 | 0 | 91 |
| Example 5 | 10 | 93 |
| Example 6 | 15 | 94 |

TABLE 5-continued

|  | f (mm) | Noise Level Index |
|---|---|---|
| Example 7 | 20 | 96 |
| Example 8 | 25 | 98 |
| Conventional Example 1 | 30 | 100 |

As the test results indicate, the shorter the value of the circumferential-direction length f of the flat portion at the tire equatorial plane side edge and at the tire widthwise-direction outer side edge, the better were the results that were obtained.

TEST EXAMPLE 6

In order to verify the effects of the invention, the pneumatic tire of the Conventional Example 1 and pneumatic tires of Examples 9 and 10, to which the invention was applied, were prepared. A test was conducted in the same manner as in Test Example 1, and noise was evaluated. The pneumatic tire of Example 9 was the pneumatic tire of the preceding fourth embodiment (see FIG. 5), and the pneumatic tire of Example 10 was the pneumatic tire of the preceding fifth embodiment (see FIG. 6).

Pneumatic Tire of Example 9 (See FIG. 5)

the depth $h_1$ of the chamfered portion 36 was 0.5 mm, the circumferential-direction length j of the chamfered portion 36 at the tire widthwise-direction outer side edge 48 was 15 mm, the depth $h_2$ of the chamfered portion 38 was 0.5 mm, the circumferential-direction length k of the chamfered portion 38 at the tire widthwise-direction outer side edge 48 was 15 mm, and the depth $h_3$ of the chamfered portion 42 was 0.5 mm.

The dimension in the tire widthwise direction of the flat portion 22 was 3 mm (constant) in the three rows of blocks in the center and 3 mm (constant) in the shoulder blocks.

Pneumatic tire of Example 10 (see FIG. 6): the depth $h_1$ of the chamfered portion 44 was 0.5 mm, the circumferential-direction length m of the chamfered portion 44 at the tire widthwise-direction outer side edge 48 was 10 mm, the depth $h_2$ of the chamfered portion 46 was 0.5 mm, the circumferential-direction length n of the chamfered portion 46 at the tire equatorial plane side edge 40 was 10 mm, the circumferential-direction length o of the chamfered portion 50 at the tire widthwise-direction outer side edge 48 was 20 mm, the circumferential-direction length q of the chamfered portion 52 at the tire equatorial plane side edge 40 was 20 mm, the depth $h_3$ of the chamfered portion 50 was 0.5 mm, and the depth $h_4$ of the chamfered portion 52 was 0.5 mm. The dimension in the tire widthwise direction of the flat portion 22 was 3 mm (constant) in the three rows of blocks in the center and 3 mm (constant) in the shoulder blocks.

The sizes of the test tires were all 195/65R14.

TABLE 6

|  | Noise Level Index |
|---|---|
| Conventional Example 1 | 100 |
| Example 9 | 91 |
| Example 10 | 93 |

It will be understood from the results of the test that noise level was suppressed more lowly in the pneumatic tires of Examples 9 and 10, to which the invention was applied, than in the pneumatic tire of Conventional Example 1.

TEST EXAMPLE 7

In order to verify the effects of the invention, the pneumatic tire of Conventional Example 1 and pneumatic tires of Examples 11 to 15, to which the invention was applied, were prepared. A test was conducted in the same manner as in Test Example 1, and noise was evaluated. The pneumatic tires of Examples 11 to 15 were, as shown in FIG. 1, pneumatic tires provided with the chamfered portion 24 at the tire widthwise-direction outer side end side of the leading edge 18A of the block 18, but the tire widthwise-direction dimension c of the flat portion 22 at the leading edge 18A was, as shown in Table 7 below, different.

The sizes of the test tires were all 195/65R14.

TABLE 7

|  | c (mm) | Noise Level Index |
|---|---|---|
| Conventional Example 1 |  | 100 |
| Example 11 | 0 | 97 |
| Example 12 | 3 | 91 |
| Example 13 | 10 | 92 |
| Example 14 | 15 | 94 |
| Example 15 | 16 | 97 |

It will be understood from the results of the test that, by setting the length of the flat portion 22 in the leading edge 18A to be 3 to 15 mm, it was possible to reduce noise level.

The following Table 8 shows the relation between a ratio c/a and noise level, wherein "a" is the dimension a in the tire widthwise direction of the leading edge 18A of the block and "c" is the tire widthwise-direction dimension c of the flat portion at the leading edge.

The sizes of the test tires were all 195/65R14.

TABLE 8

|  | c/a | Noise Level Index |
|---|---|---|
| Conventional Example 1 |  | 100 |
| Example 11 | 0 | 97 |
| Example 12 | 0.15 | 91 |
| Example 13 | 0.5 | 92 |
| Example 14 | 0.75 | 94 |
| Example 15 | 0.8 | 97 |

It will be understood from the results shown in Table 8 that, by setting the length c of the flat portion 22 in the leading edge 18A to be 0.15 to 0.75 times the tire widthwise-direction dimension a of the leading edge, it was possible to reduce noise level.

The following Table 9 shows the relation between the tire widthwise-direction length e of the chamfered portion 24 at the leading edge 18A and noise level.

The sizes of the test tires were all 195/65R14.

TABLE 9

|  | e (mm) | Noise Level Index |
|---|---|---|
| Conventional Example 1 |  | 100 |
| Example 11 | 20 | 97 |
| Example 12 | 17 | 91 |
| Example 13 | 10 | 92 |
| Example 14 | 5 | 94 |
| Example 15 | 4 | 97 |

It will be understood from the results shown in Table 9 that, by setting the tire widthwise-direction length e of the chamfered portion 24 at the leading edge 18A to be 5 to 17 mm, it was possible to reduce noise level.

The following Table 10 shows the relation between a ratio e/a and noise level, wherein "a" is the dimension a in the tire widthwise direction of the leading edge 18A of the block and "e" is the tire widthwise-direction dimension e of the chamfered portion 24 at the leading edge 18A.

The sizes of the test tires were all 195/65R14.

TABLE 10

|  | e/a | Noise Level Index |
|---|---|---|
| Conventional Example 1 |  | 100 |
| Example 11 | 1 | 97 |
| Example 12 | 0.85 | 91 |
| Example 13 | 0.5 | 92 |
| Example 14 | 0.25 | 94 |
| Example 15 | 0.2 | 97 |

It will be understood from the results shown in Table 10 that, by setting the ratio e/a to be 0.25 to 0.85, it was possible to reduce noise level.

TEST EXAMPLE 8

In order to verify the effects of the invention, the pneumatic tire of Conventional Example 1, pneumatic tires of Examples 16 to 20, to which the invention was applied, and a pneumatic tire of Comparative Example 1 were prepared. A test was conducted in the same manner as in Test Example 1, and noise was evaluated. The pneumatic tires of Examples 16 to 20 and the pneumatic tire of Comparative Example 1 were, as shown in FIG. 1, pneumatic tires provided with the chamfered portion 24 at the tire widthwise-direction outer side end side of the leading edge 18A of the block 18, but the depth $h_1$ of the chamfered portion of each tire was, as shown in Table 7 below, different.

The sizes of the test tires were all 195/65R14.

TABLE 11

|  | $h_1$ (mm) | Noise Level Index |
|---|---|---|
| Conventional Example 1 |  | 100 |
| Example 16 | 0.1 | 95 |
| Example 17 | 0.5 | 91 |
| Example 18 | 1.2 | 94 |
| Example 19 | 2.5 | 95 |
| Comparative Example 1 | 2.8 | 103 |

It will be understood from the results of the test that, by setting the depth $h_1$ of the chamfered portion 24 to be 0.1 to 2.5 mm, it was possible to reduce noise level.

The following Table 12 below shows the relation between a ratio $h_1/h_0$ and noise level.

The sizes of the test tires were all 195/65R14.

TABLE 12

|  | $h_1/h_0$ | Noise Level Index |
|---|---|---|
| Conventional Example 1 |  | 100 |
| Example 16 | 0.01 | 95 |
| Example 17 | 0.05 | 91 |
| Example 18 | 0.12 | 94 |
| Example 19 | 0.25 | 95 |
| Comparative Example 1 | 0.28 | 103 |

It will be understood from the results shown in Table 12 that, by setting the ratio $h_1/h_0$ to be 0.01 to 0.25, it was possible to reduce noise level.

TEST EXAMPLE 9

In order to verify the effects of the invention, a pneumatic tire of Conventional Example 4 and a pneumatic tire of Example 20, to which the invention was applied, were prepared. A test was conducted in the same manner as in Test Example 1, and noise was evaluated.

Embodiment 20 it was a pneumatic tire having a directional pattern provided with parallelogrammatic blocks as shown in FIG. 7, and chamfered portions 66 and 68 were provided as shown in FIGS. 8 and 9.

The width of the rib 58 was 10 mm, the groove width of the circumferential-direction grooves 54 was 8 mm, and the groove width of the slanted grooves 56 was 7 mm.

With respect to the blocks 60 at the rib 58 sides, the tire widthwise-direction dimension a was 25 mm, the tire circumferential-direction dimension b of the edges arranged in the tire widthwise-direction was 30 mm, the height $h_0$ was 10 mm, the depths $h_1$ and $h_2$ were 0.5 mm, the angle θ was 40 degrees, and the tire widthwise-direction dimension c of the flat portion 64 was 3 mm.

The dimensions of the blocks 60 at the shoulders were the same as those of the blocks 60 at the rib 58 sides.

Conventional Example 4 included the same pattern as the pneumatic tire of Example 20, but included blocks on which chamfered portions were not formed.

The sizes of the test tires were both 195/65R14.

TABLE 13

|  | Noise Level Index |
|---|---|
| Conventional Example 4 | 100 |
| Example 20 | 90 |

It will be understood from the test results that noise level was reduced more in the pneumatic tire of Example 20, to which the invention was applied, than in the pneumatic tire of Conventional Example 4.

Seventh Embodiment

A seventh embodiment of the invention will next be described in detail with reference to the drawings.

Figure 14:
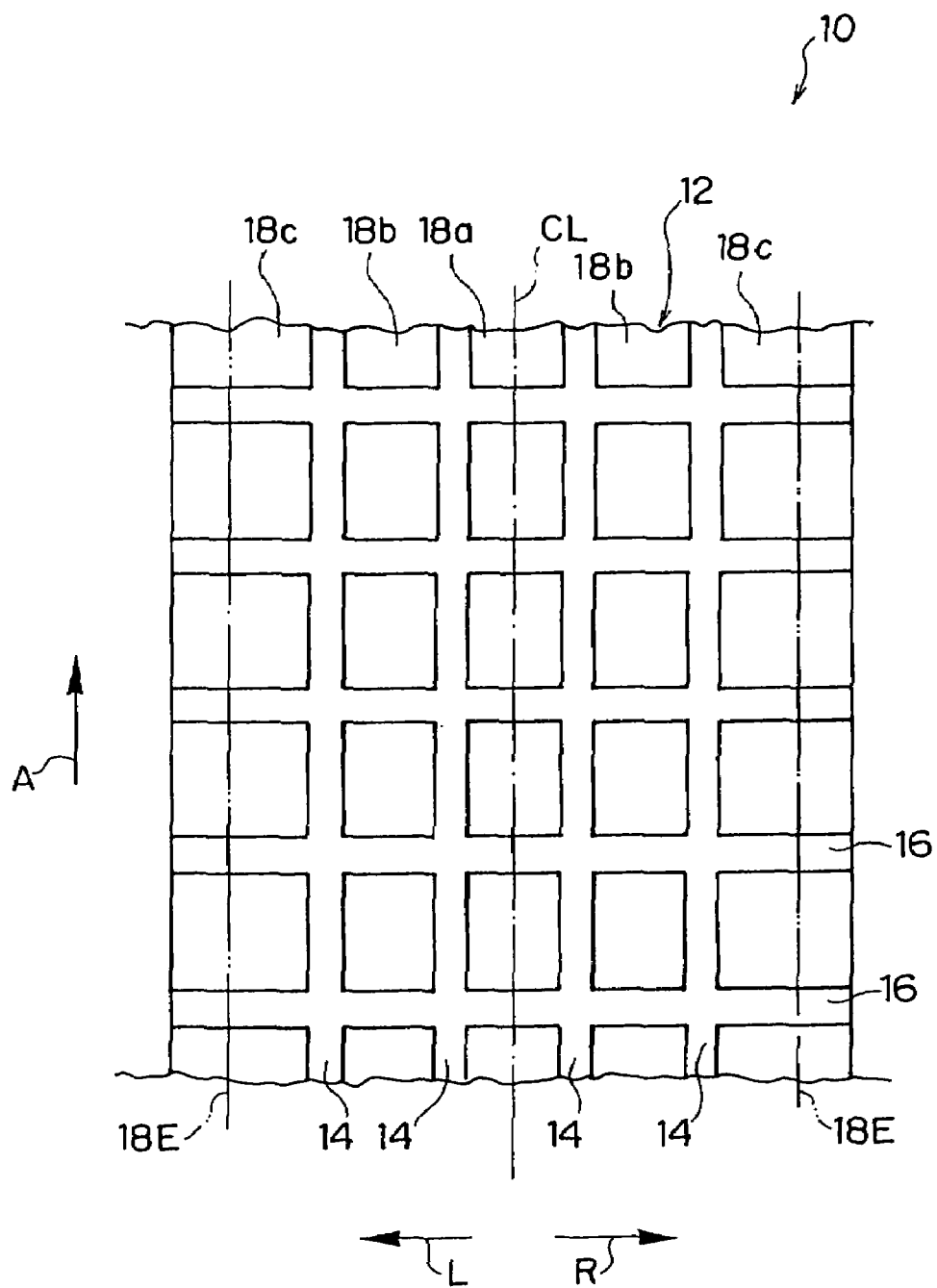
FIG. 14 is a plan view of a tread of the pneumatic tire relating to the seventh embodiment of the invention.

As shown in FIG. 14, plural rectangular center blocks 18a, second blocks 18b, and shoulder blocks 18c are provided on the tread 12 of the pneumatic tire 10, respectively, by dividing the tread 12 by plural circumferential-direction grooves 14 that extend along the tire circumferential direction (the direction of arrow A and the direction opposite from the direction of arrow A) and by plural lug grooves 16 that extend along the tire widthwise direction (the direction of arrow R and the direction of arrow L) and intersect the circumferential-direction grooves 14.

It should be noted that the pneumatic tire 10 rotates in the direction of arrow A when the vehicle moves forward.

Figure 13:
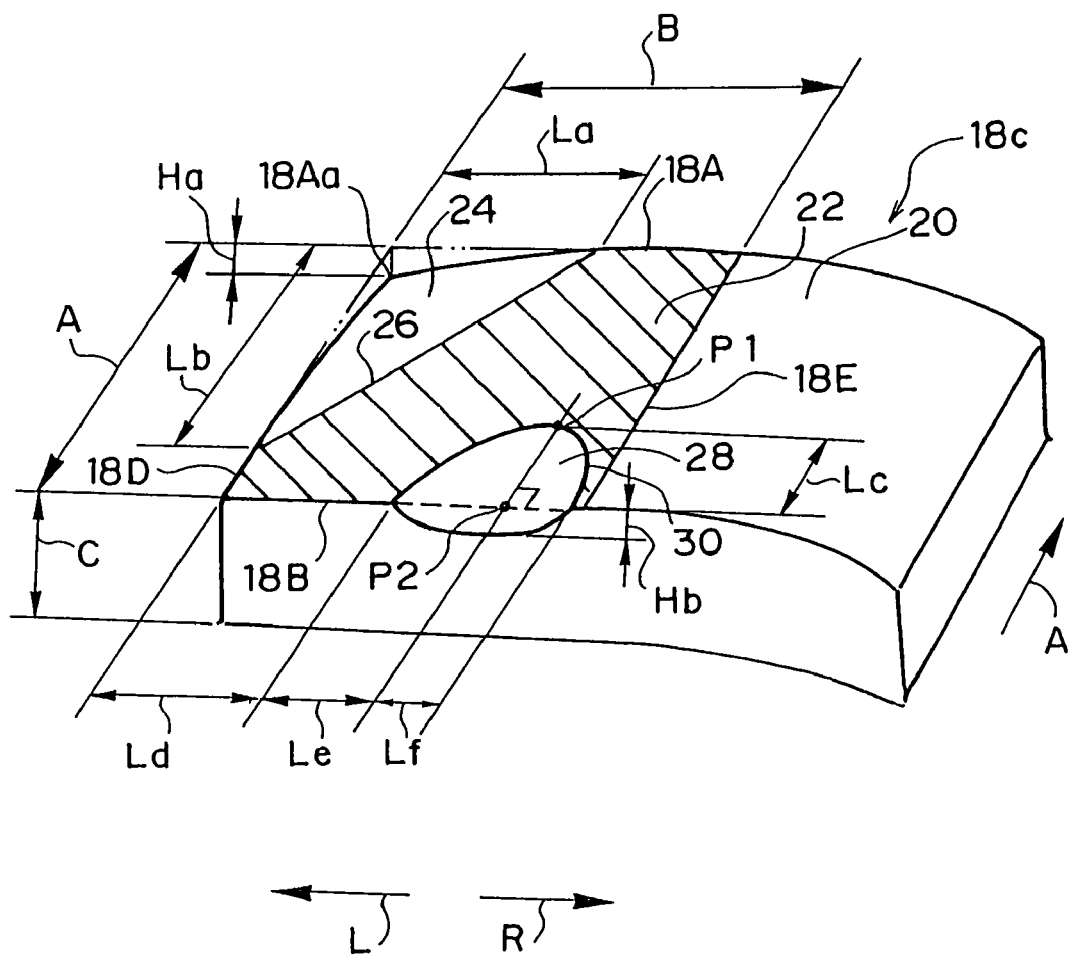
FIG. 13 is a perspective view of a shoulder block of a pneumatic tire relating to a seventh embodiment of the invention.

As shown in FIG. 13, a tread surface of the shoulder blocks 18c includes the flat portion 22 that coincides with a tire (tread) outer contour configuration.

In FIG. 13, reference numeral 18E denotes a ground-contact end, reference numeral 18A denotes a leading edge of the shoulder block 18*c*, and reference numeral 18B denotes a trailing edge of the shoulder block 18*c*. When the pneumatic tire 10 rolls on a road surface, the shoulder block 18*c* contacts the road surface at first by the leading edge 18A and separates from the road surface at first by the trailing edge 18B.

A first chamfered portion 24 is formed at a corner portion at the tire equatorial plane side of the leading edge 18A of the shoulder block 18*c* (it should be noted that the shoulder block 18*c* shown in FIG. 13 is a shoulder block 18*c* positioned to the right side of the tire equatorial plane CL of FIG. 14).

Figure 15:
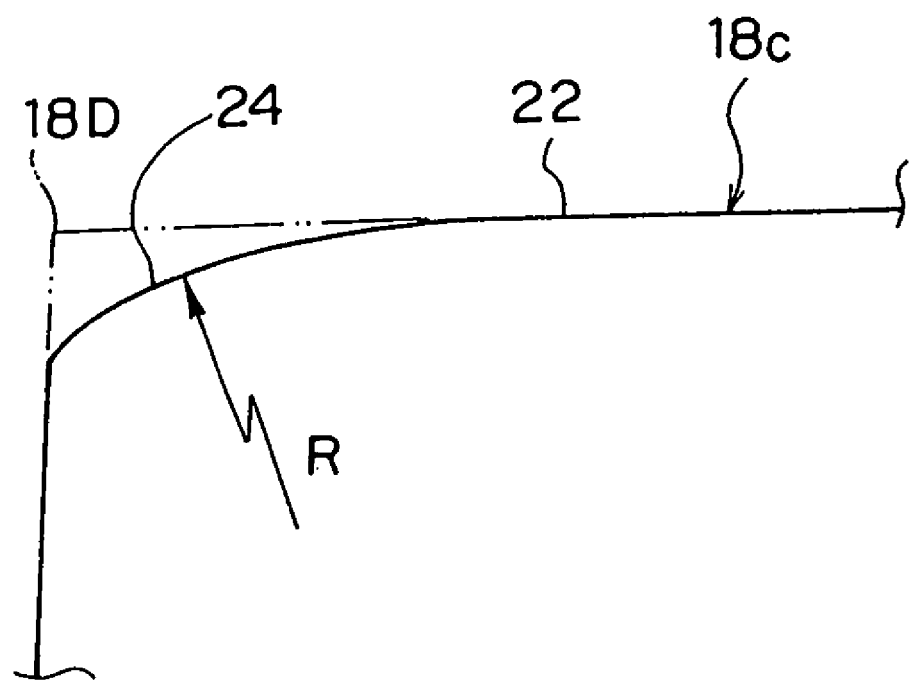
FIG. 15 is a cross-sectional view along a tire widthwise direction of the shoulder block.

As shown in FIG. 15, the first chamfered portion 24 is a convex curved surface (in the present embodiment, a circular arc curved surface) that smoothly connects with the flat portion 22.

As shown in FIG. 13, a border 26 between the first chamfered portion 24 and the flat portion 22 is diagonal with respect to the tire circumferential direction, and the height of the first chamfered portion 24 gradually decreases from the border 26 towards a tire equatorial plane side end 18Aa of the leading edge 18A.

Namely, the tire equatorial plane side end 18Aa of the leading edge 18A becomes the lowest portion of the leading edge 18A within a ground-contact surface.

A second chamfered portion 28 is formed at an intermediate portion of the trailing edge 18B of the shoulder block 18*c*.

Figure 16:
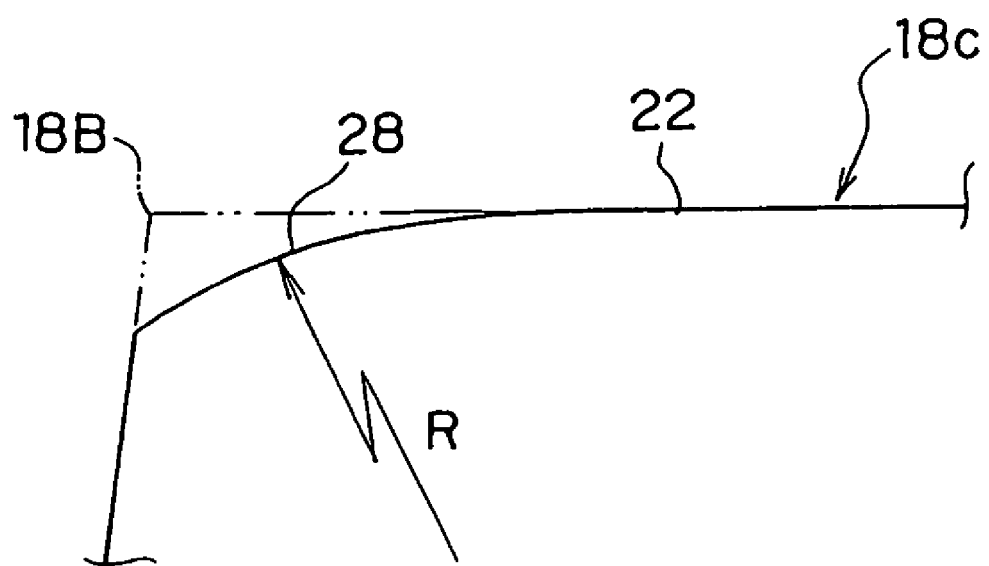
FIG. 16 is a cross view along the circumferential direction of the shoulder block.

As shown in FIG. 16, the second chamfered portion 28 has a convex curved surface (in the present embodiment, a circular arc curved surface) that smoothly connects with the flat portion 22.

As shown in FIG. 13, a border 30 between the second chamfered portion 28 and the flat portion 22 has a substantially circular arc configuration, and the height of the second chamfered portion 28 gradually decreases from the border 30 towards a circular arc center of border 30.

Reference letter A denotes the dimension measured along the tire circumferential direction of the end edge 18D on the tire equatorial plane side, reference letter B denotes the dimension measured, in the tire widthwise-outer-side direction, from the end edge 18D on the tire equatorial plane side of the shoulder block 18*c* to the ground-contact end 18E, reference letter C denotes block height at the end edge 18D on the tire equatorial plane side of the shoulder block 18*c*, reference letter Ha denotes the depth at the lowest portion of the first chamfered portion 24 (in the present embodiment, the tire equatorial plane side end 18Aa) from the flat portion 22 (plane), reference letter La denotes the dimension of the first chamfered portion 24 measured from the end edge 18D on the tire equatorial plane side 24 towards the tire widthwise-direction outer side, reference letter Lb denotes the dimension of the first chamfered portion 24 measured along the tire circumferential direction from the leading edge 18A, reference letter Hb denotes the depth at the lowest portion of the second chamfered portion 28 from the flat portion 22 (plane), reference letter P1 denotes the tire circumferential-direction outermost end of the second chamfered portion 28 that is furthest from the leading edge 18A (trailing edge 18B) in the tire circumferential direction, reference letter Lc denotes the dimension measured along the tire circumferential direction from the tire circumferential-direction outermost end P1 to the trailing edge 18B, reference letter Ld is the dimension measured along the tire widthwise direction from an end portion, of the block, on the tire equatorial plane side, of the trailing edge 18B to the second chamfered portion 28, P2 is an intersection between the trailing edge 18B and an imaginary straight line FL that passes through the tire circumferential-direction outermost end P1 along the tire circumferential direction, reference letter Le is the dimension measured along the tire widthwise direction from the intersection P2 to a tire equatorial plane side end portion of the second chamfered portion 28, and reference letter Lf is the dimension measured along the tire widthwise direction from the intersection P2 to the tire widthwise-direction outer side end of the second chamfered portion 28.

Preferable ranges of each dimension and ratios will next be described.

Dimension Ha is preferably 0.2 mm to 2.5 mm.
Ratio Ha/C is preferably 0.02 to 0.25.
Dimension Hb is preferably 0.2 mm to 2.5 mm.
Ratio Hb/C is preferably 0.02 to 0.25.
Dimension La is preferably 5 mm or greater.
Ratio La/B is preferably 0.25 or greater.
Dimension Lb is preferably 10 mm or greater.
Ratio Lb/A is preferably 0.3 or greater.
Dimension Lc is preferably 2 mm to 25 mm.
Ratio Lc/A is preferably 0.17 to 0.83.
Dimension Ld is preferably 3 mm to 15 mm.
Ratio Ld/B is preferably 0.15 to 0.75.
Ratio Le is preferably 2 mm to 15 mm.
Ratio Le/B is preferably 0.1 to 0.75.
Dimension Lf is preferably 2 mm or greater.
Ratio Lf/B is preferably 0.1 or greater.

(Action)

The action of the pneumatic tire 10 of the present embodiment will next be described.

When the pneumatic tire 10 rolls and the shoulder blocks 18*c* contact the road surface, first, with respect to the leading edge 18A, the flat portion 22 contacts the ground, and then the first chamfered portion 24 contacts the ground.

Because the height of the first chamfered portion 24 gradually decreases towards the tire equatorial plane side, the first chamfered portion 24 gradually makes contact with the road surface.

Namely, because all of the leading edge 18A of the shoulder block 18*c* does not make immediate contact with the road surface but rather gradually contacts the road surface, force input that generates sound is dispersed in terms of input timing and it is possible to suppress the generation of noise (mainly a striking sound) at the initial stage of the shoulder block 18*c* contacting the road surface.

Furthermore, because the tire widthwise-direction dimension of the flat portion 22 changes in the tire circumferential direction, i.e., because the tire widthwise-direction position of the flat portion 22 changes in the tire circumferential direction, it is possible for the entire block to gently receive stress generated at the time of rolling, whereby it is possible to suppress the level of noise generated by the shoulder block 18*c* at the time the shoulder block 18*c* contacts the ground at a low level.

Moreover, because the second chamfered portion 28 is formed at the trailing edge 18B side on the shoulder block 18*c*, the trailing edge 18B of the shoulder block 18*c* does not separate from the road surface all at once but gradually. Therefore, it is possible to suppress the generation of noise when the shoulder block 18*c* separates from the road surface.

When the dimension Ha, the ratio Ha/C, the dimension Hb, the ratio Hb/C, the dimension La, the ratio La/B, the dimension Lb, the ratio Lb/A, the dimension Lc, the ratio Lc/A, the dimension Ld, the ratio Ld/B, the dimension Le, the ratio Le/B, the dimension Lf, and the ratio Lf/B fall outside of the aforementioned ranges, it becomes impossible to sufficiently suppress the generation of noise.

Figure 17:
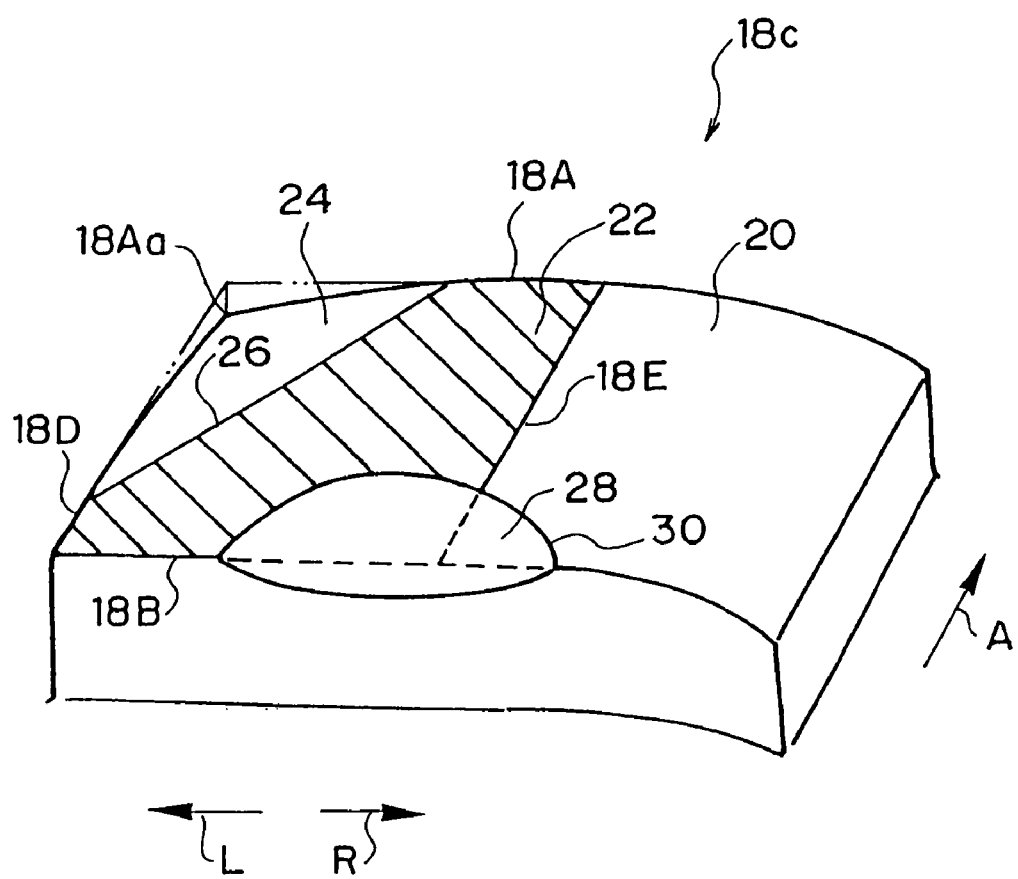
FIG. 17 is a perspective view of a shoulder block of a pneumatic tire relating to another embodiment of the invention.

It should be noted that, although the second chamfered portion 28 is disposed closer to the tire equatorial plane side than to the ground-contact end 18E in FIG. 13, the second chamfered portion 28 may also be disposed such that a portion thereof extends to the tire widthwise-direction outer side beyond the ground-contact end 18E, as shown in FIG. 17.

Also, it is preferable that the flat portion 22 and at least one of the first chamfered portion 24 and the second chamfered portion 28 are provided in any portion in the tire circumferential direction when the shoulder block 18c is seen in cross section along the tire widthwise direction.

By the aforementioned structure, it is possible to make the input per unit time of the peak force resulting from deformation prolonged for a period from leading initiation to trailing completion. In this manner, it is possible to suppress the level of noise generated by the shoulder block 18c at an even lower level.

In the shoulder block 18c, by making the ground-contact edge 18E the flat portion 22 along the tire outer contour, it becomes possible to maximize the vertical interval of the ground-contact portion at the leading edge and to delay the time that the end thereof contacts the ground as late as possible.

Figure 18:
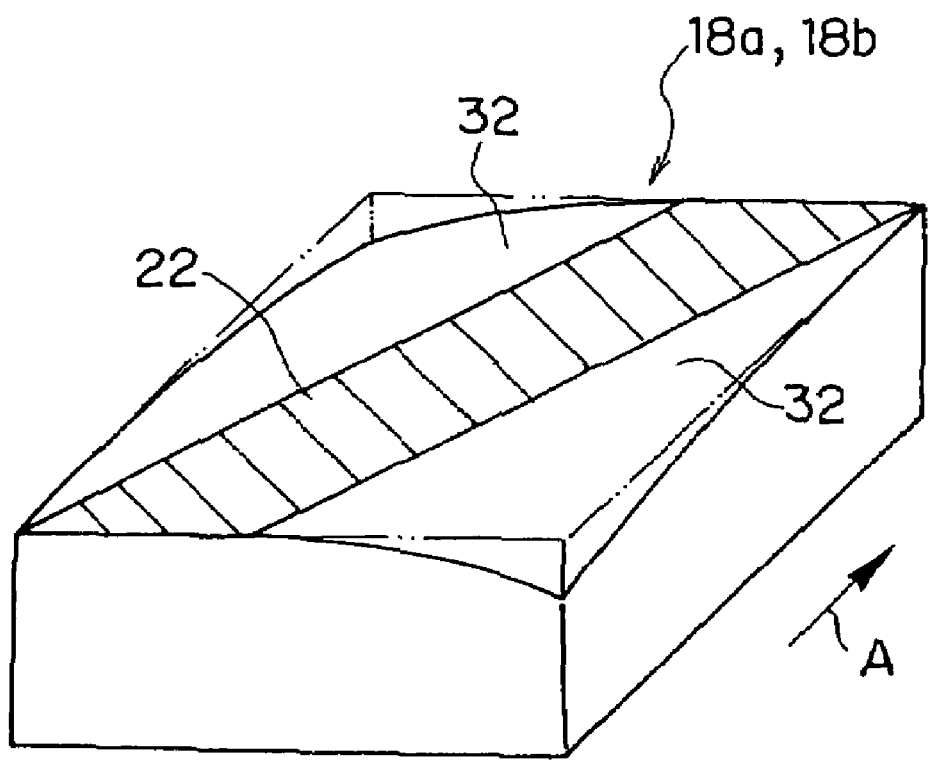
FIG. 18 is a perspective view of a shoulder block of a pneumatic tire relating to yet another embodiment of the invention.
Figure 18:
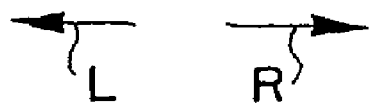

As shown in FIG. 18, it is preferable to dispose chamfered portions 32, which are the same as the first chamfered portion 24, at opposite corners at the leading side and at the trailing side in the center blocks 18a and in the second blocks 18b.

In such a structure, similar to the shoulder blocks 18c, it is also possible to suppress in the center blocks 18a and in the second blocks 18b the level of noise generated by the blocks at a low level.

Another Embodiment

Figure 19:
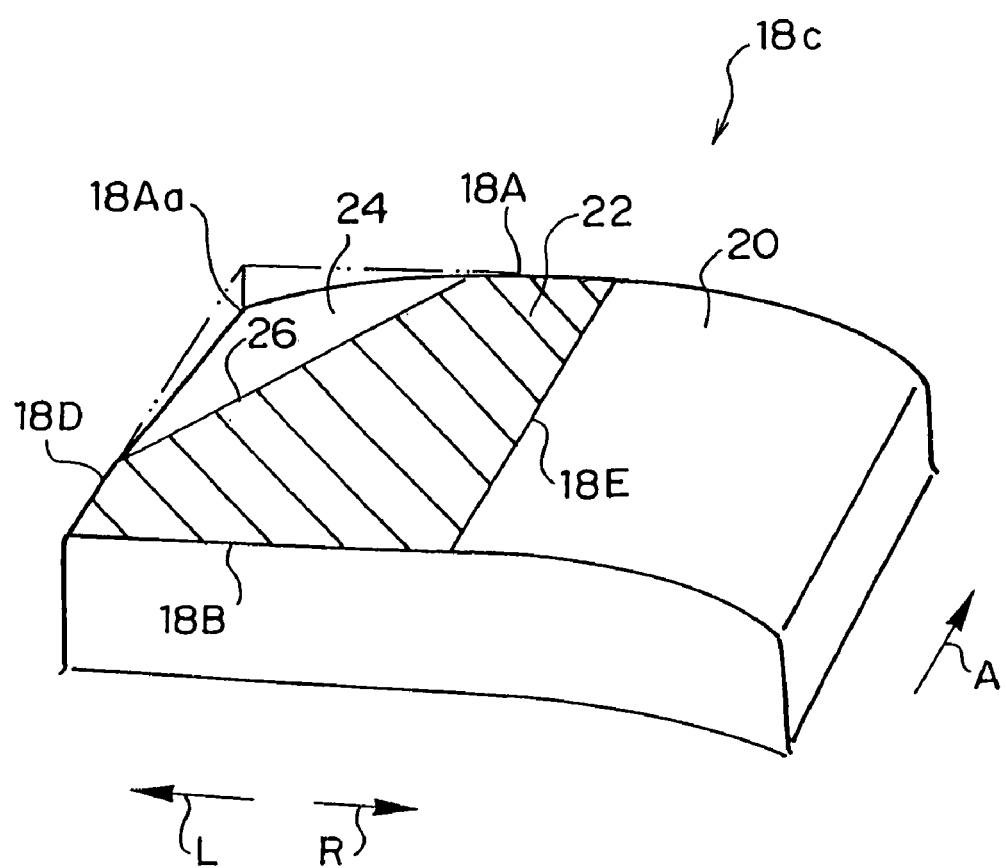
FIG. 19 is a perspective view of a shoulder block of a pneumatic tire relating to yet another embodiment of the invention.
Figure 20:
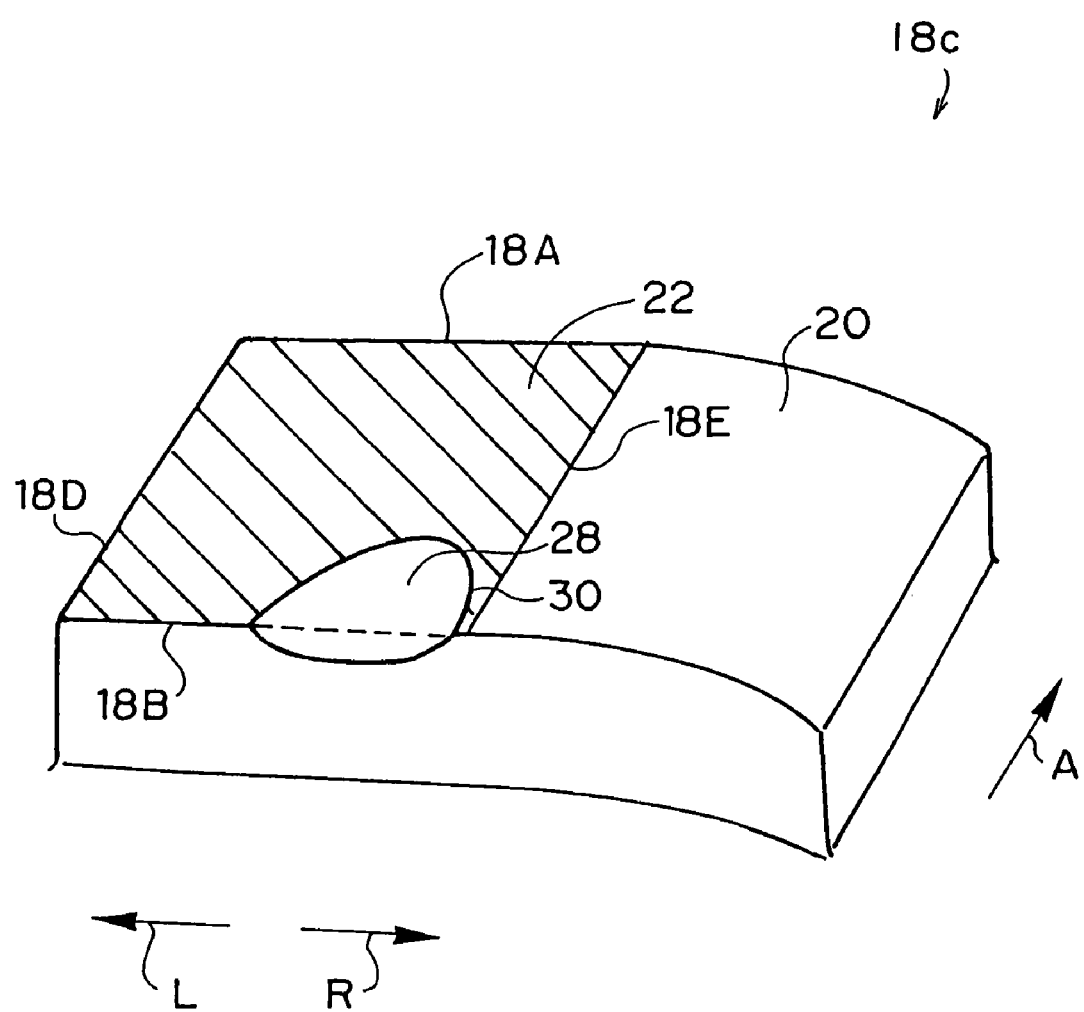
FIG. 20 is a perspective view of a shoulder block of a pneumatic tire relating to yet another embodiment of the invention.

Although the first chamfered portion 24 and the second chamfered portion 28 were disposed on the shoulder block 18c in the preceding embodiment, the present invention is not limited to the same. While the effects may drop somewhat, it is also possible to provide only the first chamfered portion 24 on the shoulder block 18c, as shown in FIG. 19, or to provide only the second chamfered portion 28 on the shoulder block 18c, as shown in FIG. 20.

Also, although the pneumatic tire 10 in the preceding embodiment rolled in the direction of arrow A, the same effects can be obtained when the pneumatic tire 10 rolls in the direction opposite from the direction of arrow A.

Figure 31:
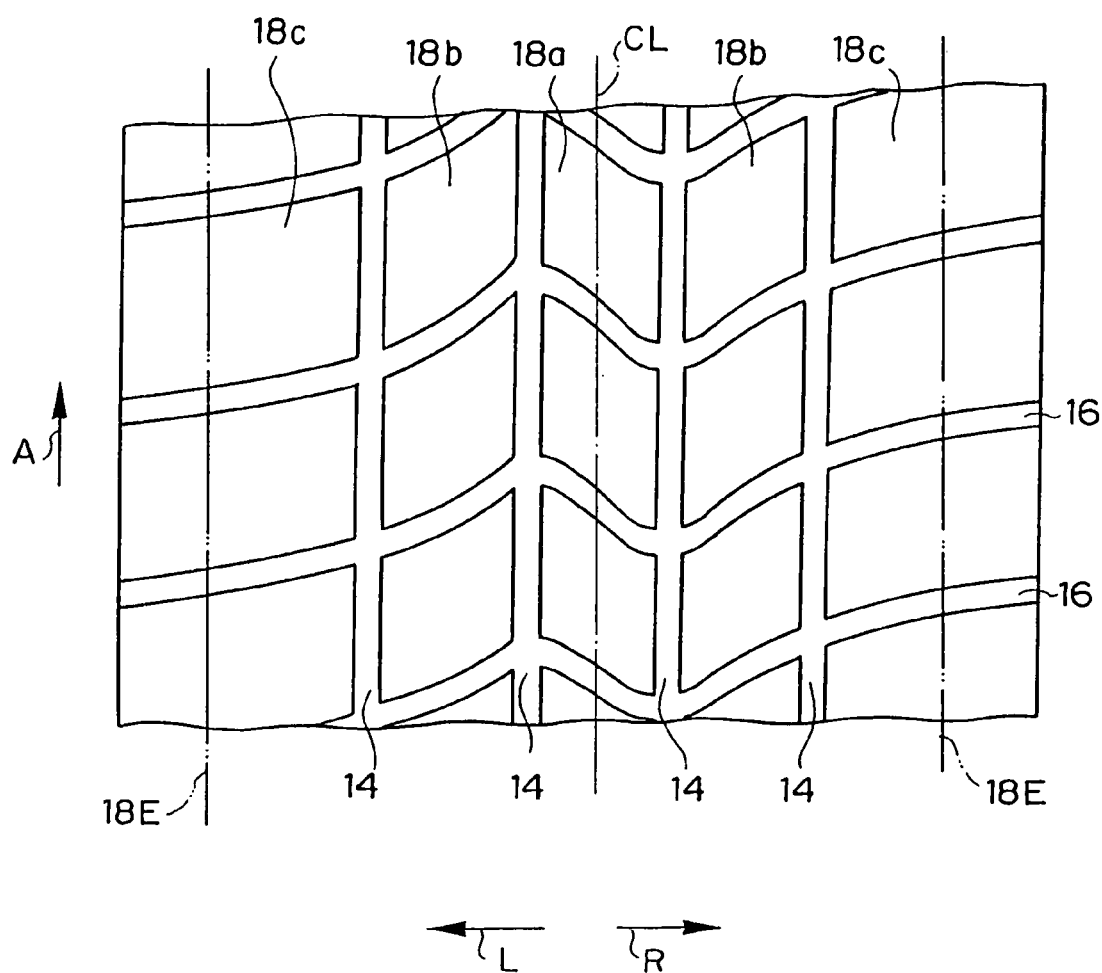
FIG. 31 is a plan view of a tread of a pneumatic tire relating to yet another embodiment of the invention.

Although the lug grooves 16 extended in the tire widthwise direction in the pneumatic tire 10 of the preceding embodiment, the lug grooves 16 may also slant (angle θ) with respect to the tire widthwise direction, as shown in FIG. 31.

In the pattern shown in FIG. 31, the chamfered portion 32 is provided at opposite corners at the leading side and at the trailing side in the center blocks 18a and in the second blocks 18b, as in FIG. 18.

Figure 32:
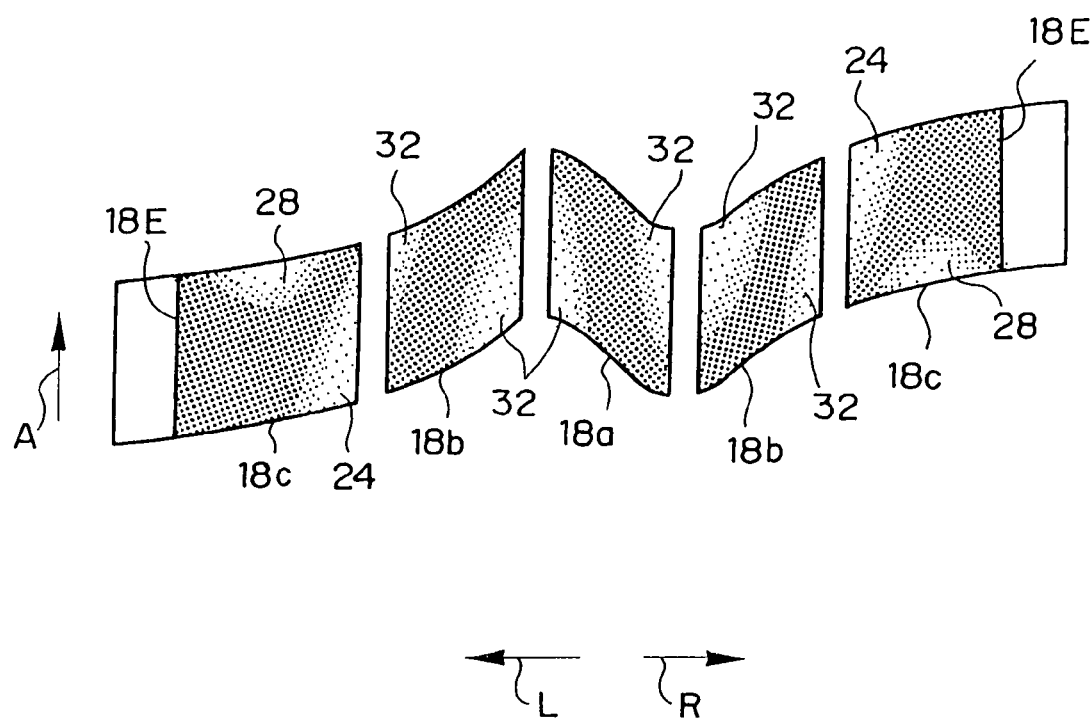
FIG. 32 is an explanatory view illustrating ground-contacting pressure of the blocks shown in FIG. 31.

In FIG. 32, ground-contacting pressure of the pattern of FIG. 31 is shown. The higher the dot density of portions at the ground-contacting surface is, the higher is the ground-contacting pressure, and the lower the dot density of portions at the ground-contacting surface is, the lower is the ground-contacting pressure.

TEST EXAMPLE 10

The pneumatic tire of Conventional Example 1 and the pneumatic tire of Example 1, to which the invention was applied, were prepared, and noise was measured using an indoor drum tester.

The test measured sound pressure (peaks of sound pressure waveforms) near the sides of the test tires at a speed of 80 km/hour.

In Test Example 1, a test was conducted with respect to a tire provided with the tread pattern (monopitch) shown in FIG. 14.

The size of the test tires was 195/65R15. As the block size, dimension A was 30 mm, dimension B was 20 mm, and dimension C was 10 mm (see FIG. 13).

The width of the ground contact region in the shoulder blocks was equivalent to dimension B (20 mm).

Figure 30:
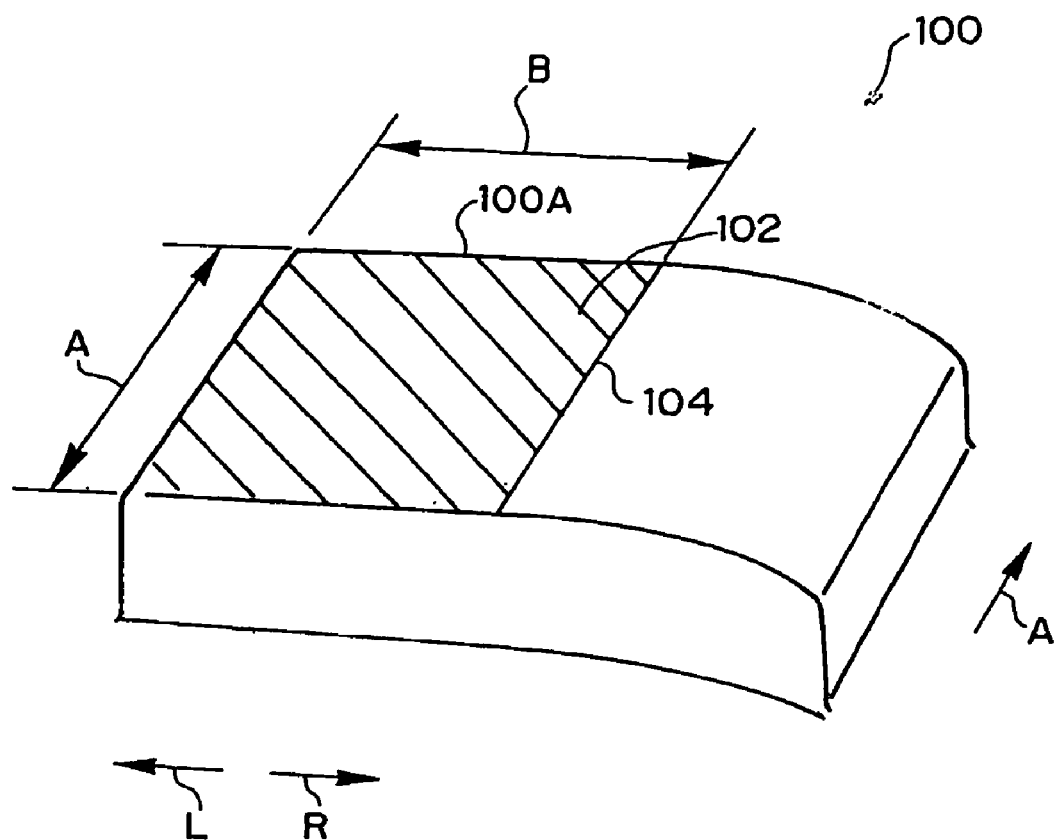
FIG. 30 is a perspective view of a shoulder block of a pneumatic tire relating to a conventional example.

Tire of Conventional Example 1 a tire having no chamfered portions formed thereon and in which the tread surface of the shoulder blocks was flat (along the tire outer contour configuration) (see FIG. 30).

Tire of Example 1 a tire in which a chamfered portion was formed at a corner on the leading side of the shoulder block, as shown in FIG. 19. Dimensions and ratios were as listed below in Table 14.

TABLE 14

| | | |
|---|---|---|
| Dimension | A | 30 mm |
| | B | 20 mm |
| | C | 10 mm |
| | Ha | 0.5 mm |
| | Hb | 0 |
| | La | 15 mm |
| | Lb | 25 mm |
| | Lc | 0 |
| | Ld | 0 |
| | Le | 0 |
| | Lf | 0 |
| Ratio | Ha/C | 0.05 |
| | Hb/C | 0 |
| | La/B | 0.75 |
| | Lb/A | 0.83 |
| | Lc/A | 0 |
| | Ld/B | 0 |
| | Le/B | 0 |
| | Lf/B | 0 |

In Table 14, 0 (mm) indicates that there had not been done any processing corresponding to that dimension.

An index display, in which the size of the sound pressure waveform peak of the pneumatic tire of Conventional Example 1 was 100, was used for evaluation. The lower the numerical value, the lower was the noise level, indicating that the amount of noise generated was suppressed at a low level. The test results are shown in Table 15 below, and it will be understood that the noise level was sufficiently low in the tire of Example 1.

TABLE 15

| | Noise Level |
|---|---|
| Conventional Example 1 | 100 |
| Example 1 | 87 |

TEST EXAMPLE 11

The pneumatic tire of Conventional Example 1 and the pneumatic tire of Example 2, to which the invention was applied, were prepared, and a test was conducted in the same manner as in Test Example 1.

In Test Example 2, a test was conducted in a manner similar to Test Example 1 with respect to a tire provided with the tread pattern (monopitch) shown in FIG. 14, but only the configuration of the shoulder blocks was different.

Tire of Example 2 a tire having a chamfered portion formed at the trailing edge of the shoulder block, as shown in FIG. 20. Dimensions and ratios were as listed below in Table 16.

TABLE 16

| | | |
|---|---|---|
| Dimension | A | 30 mm |
| | B | 20 mm |
| | C | 10 mm |
| | Ha | 0 |
| | Hb | 0.5 mm |
| | La | 0 |
| | Lb | 0 |
| | Lc | 12 mm |
| | Ld | 6 mm |
| | Le | 7 mm |
| | Lf | 7 mm |
| Ratio | Ha/C | 0 |
| | Hb/C | 0.05 |
| | La/B | 0 |
| | Lb/A | 0 |
| | Lc/A | 0.4 |
| | Ld/B | 0.3 |
| | Le/B | 0.35 |
| | Lf/B | 0.35 |

In Table 16, 0 (mm) indicates that there had not been done any processing corresponding to that dimension.

The test results are shown in Table 17 below, and it will be understood that the noise level was sufficiently low in the tire of Example 2.

TABLE 17

| | Noise Level |
|---|---|
| Conventional Example 1 | 100 |
| Example 2 | 87 |

TEST EXAMPLE 12

The pneumatic tire of Conventional Example 1 and the pneumatic tire of Example 3, to which the invention was applied, were prepared, and a test was conducted in the same manner as in Test Example 10.

In Test Example 3, a test was conducted in a manner similar to Test Examples 10 and 11 with respect to a tire provided with the tread pattern (monopitch) shown in FIG. 14, but only the configuration of the shoulder blocks was different.

Tire of Example 3 a tire having a chamfered portion formed at the leading side corner of the shoulder block and at the trailing edge of the shoulder block, respectively, as shown in FIG. 13. Dimensions and ratios were as listed below in Table 18.

TABLE 18

| | | |
|---|---|---|
| Dimension | A | 30 mm |
| | B | 20 mm |
| | C | 10 mm |
| | Ha | 0.5 mm |
| | Hb | 0.5 mm |
| | La | 15 mm |
| | Lb | 25 mm |
| | Lc | 12 mm |
| | Ld | 6 mm |
| | Le | 7 mm |
| | Lf | 7 mm |
| Ratio | Ha/C | 0.05 |
| | Hb/C | 0.05 |
| | La/B | 0.75 |
| | Lb/A | 0.83 |
| | Lc/A | 0.4 |
| | Ld/B | 0.3 |
| | Le/B | 0.35 |
| | Lf/B | 0.35 |

In Table 18, 0 (mm) indicates that there had not been done any processing corresponding to that dimension.

The test results are shown in Table 19 below, and it will be understood that the noise level was even lower in the tire of Example 3 than in the preceding Examples 1 and 2 due to two chamfered portions being disposed.

TABLE 19

| | Noise Level |
|---|---|
| Conventional Example 1 | 100 |
| Example 3 | 77 |

TEST EXAMPLE 13

The pneumatic tire of Conventional Example 1 and the pneumatic tires of Examples 4 to 11, to which the invention was applied, were prepared, and a test was conducted in the same manner as in Test Example 1.

In Test Example 4, a test was conducted in a manner similar to Test Example 10 with respect to a tire provided with the tread pattern (monopitch) shown in FIG. 14.

Tires of Examples 4 to 11 tires having a chamfered portion formed at the leading side corner of the shoulder block, as shown in FIG. 19, with La being fixed at 15 mm, Lb being fixed at 25 mm, and the dimension Ha being varied.

Figures 21A, 21B:
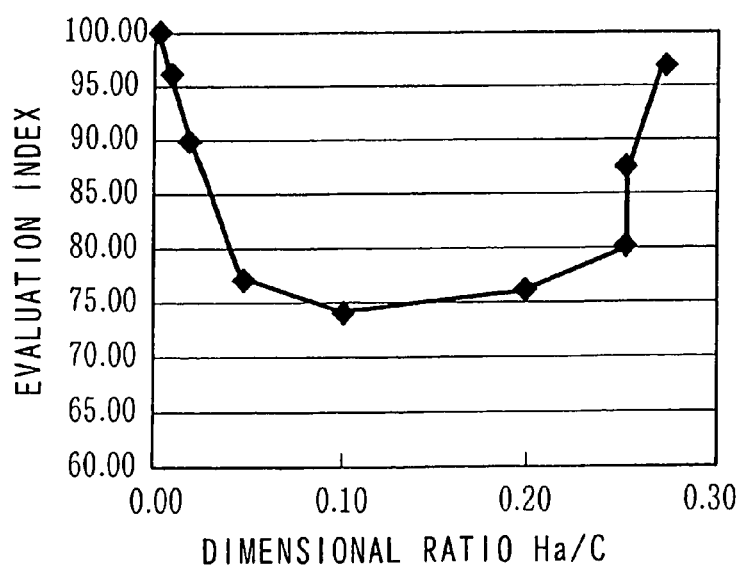
FIGS. 21A and 21B are the results of Test Example 4.

Dimensions and ratios, and the evaluation, were as listed in FIG. 21.

It will be understood from the test results that, in order to sufficiently reduce noise level, it is best for Ha to be 0.2 to 2.5 mm and for Ha/C to be 0.02 to 0.25.

TEST EXAMPLE 14

The pneumatic tire of Conventional Example 1 and the pneumatic tires of Examples 12 to 19, to which the invention was applied, were prepared, and a test was conducted in the same manner as in Test Example 10.

In Test Example 14, a test was conducted in a manner similar to Test Example 10 with respect to a tire provided with the tread pattern (monopitch) shown in FIG. 14.

Tires of Examples 12 to 19 tires having a chamfered portion formed at the trailing side of the shoulder block, as shown in FIG. 20, with Lc being fixed at 12 mm, Ld being fixed at 6 mm, Le being fixed at 7 mm, Lf being fixed at 7 mm, and the dimension Hb being varied.

Figures 22A, 22B:
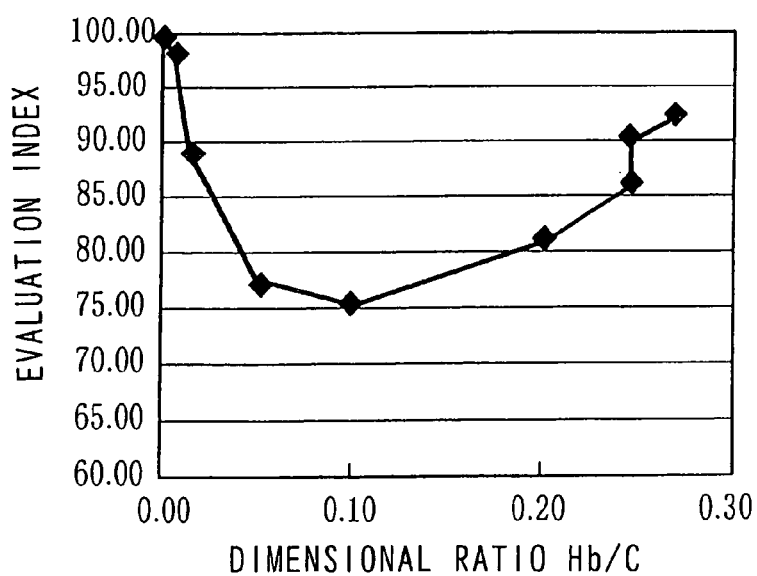
FIGS. 22A and 22B are the results of Test Example 5.

Dimensions and ratios, and the evaluation, were as listed in FIG. 22.

It will be understood from the test results that, in order to sufficiently reduce noise level, it is best for Hb to be 0.2 to 2.5 mm and for Hb/C to be 0.02 to 0.25.

TEST EXAMPLE 15

The pneumatic tire of Conventional Example 1 and pneumatic tires of Examples 20 to 26, to which the invention was applied, were prepared, and a test was conducted in the same manner as in Test Example 10.

In Test Example 15, a test was conducted in a manner similar to Test Example 10 with respect to a tire provided with the tread pattern (monopitch) shown in FIG. 14.

Tires of Examples 20 to 26 tires having a chamfered portion formed at the leading side corner of the shoulder block, as shown in FIG. 19, with Lb being fixed at 25 mm, Ha being fixed at 0.5 mm, and the dimension La being varied.

Figures 23A, 23B:
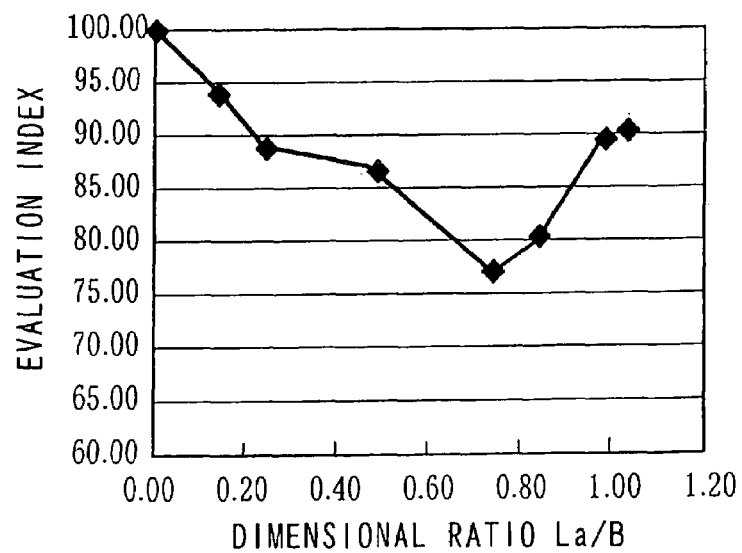
FIGS. 23A and 23B are the results of Test Example 6.

Dimensions and ratios, and the evaluation, were as listed in FIG. 23.

It will be understood from the test results that, in order to sufficiently reduce noise level, it is best for La to be 0.2 to 2.5 mm and for La/B to be 0.02 to 0.25.

TEST EXAMPLE 16

The pneumatic tire of Conventional Example 1 and pneumatic tires of Examples 27 to 30, to which the invention was applied, were prepared, and a test was conducted in the same manner as in Test Example 1.

In Test Example 16, a test was conducted in a manner similar to Test Example 10 with respect to a tire provided with the tread pattern (monopitch) shown in FIG. 14.

Tires of Examples 27 to 30 tires having a chamfered portion formed at the leading side corner of the shoulder block, as shown in FIG. 19, with La being fixed at 15 mm, Ha being fixed at 0.5 mm, and the dimension Lb being varied.

Figures 24A, 24B:
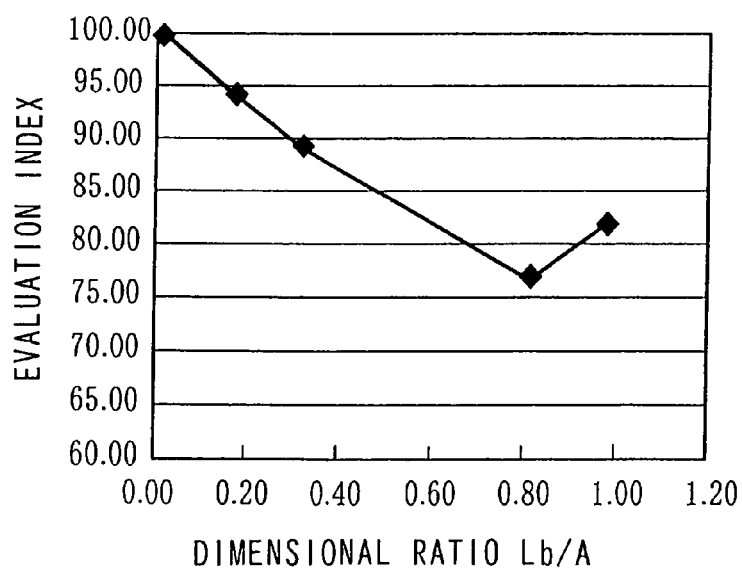
FIGS. 24A and 24B are the results of Test Example 7.

Dimensions and ratios, and the evaluation, were as listed in FIG. 24.

It will be understood from the test results that, in order to sufficiently reduce noise level, it is best for Lb to be 10 mm or greater and for Lb/A to be 0.3 or greater.

TEST EXAMPLE 17

The pneumatic tire of Conventional Example 1 and pneumatic tires of Examples 31 to 35, to which the invention was applied, were prepared, and a test was conducted in the same manner as in Test Example 10.

In Test Example 17, a test was conducted in a manner similar to Test Example 10 with respect to a tire provided with the tread pattern (monopitch) shown in FIG. 14.

Tires of Examples 31 to 35 tires having a chamfered portion formed at the leading side corner of the shoulder block, as shown in FIG. 19, with Ld being fixed at 6 mm, Le being fixed at 7 mm, Lf being fixed at 7 mm, Hb being fixed at 0.5 mm, and the dimension Lc being varied.

Figures 25A, 25B:
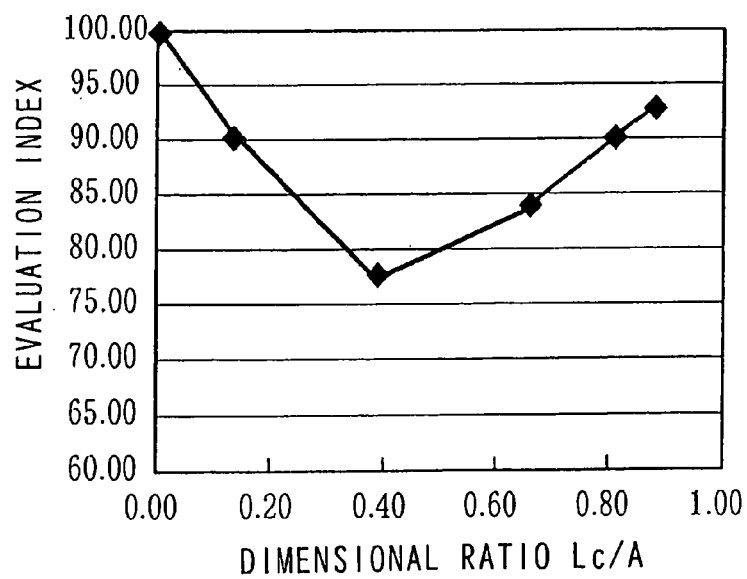
FIGS. 25A and 25B are the results of Test Example 8.

Dimensions and ratios, and the evaluation, were as listed in FIG. 25.

It will be understood from the test results that, in order to sufficiently reduce noise level, it is best for Lc to be 5 mm to 25 mm and for Lc/A to be 0.17 to 0.83.

TEST EXAMPLE 18

The pneumatic tire of Conventional Example 1 and pneumatic tires of Examples 31 to 35, to which the invention was applied, were prepared, and a test was conducted in the same manner as in Test Example 10.

In Test Example 18, a test was conducted in a manner similar to Test Example 10 with respect to a tire provided with the tread pattern (monopitch) shown in FIG. 14.

Tires of Examples 36 to 40 tires having a chamfered portion formed at the trailing side of the shoulder block, as shown in FIG. 20, with Lc being fixed at 12 mm, Le being fixed at 7 mm, Lf being fixed at 7 mm, Hb being fixed at 0.5 mm, and the dimension Ld being varied.

Figures 26A, 26B:
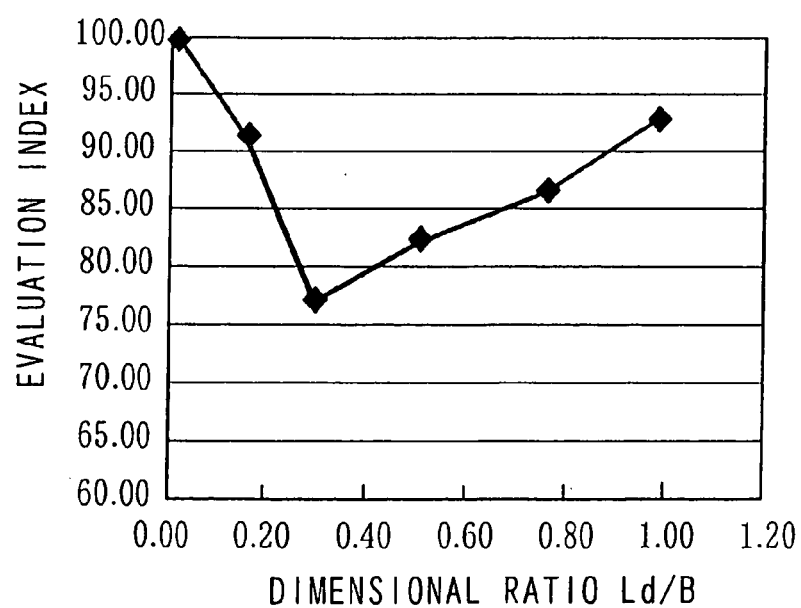
FIGS. 26A and 26B are the results of Test Example 9.

Dimensions and ratios, and the evaluation, were as listed in FIG. 26.

It will be understood from the test results that, in order to sufficiently reduce noise level, it is best for Ld to be 3 mm to 15 mm and for Ld/B to be 0.15 to 0.75.

TEST EXAMPLE 19

The pneumatic tire of Conventional Example 1 and pneumatic tires of Examples 41 to 45, to which the invention was applied, were prepared, and a test was conducted in the same manner as in Test Example 10.

In Test Example 19, a test was conducted in a manner similar to Test Example 10 with respect to a tire provided with the tread pattern (monopitch) shown in FIG. 14.

Tires of Examples 41 to 45 tires having a chamfered portion formed at the trailing side of the shoulder block, as shown in FIG. 20, with Ld being fixed at 6 mm, Lc being fixed at 12 mm, Lf being fixed at 7 mm, Hb being fixed at 0.5 mm, and the dimension Le being varied.

Figures 27A, 27B:
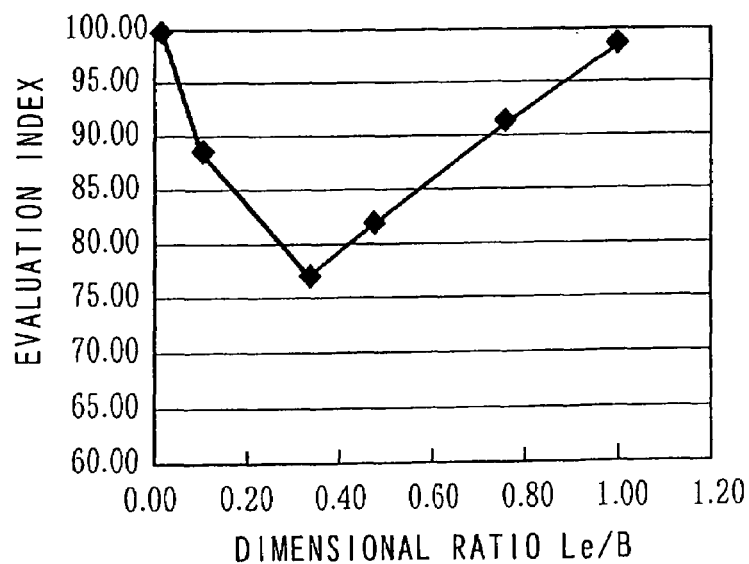
FIGS. 27A and 27B are the results of Test Example 10.

Dimensions and ratios, and the evaluation, were as listed in FIG. 27.

It will be understood from the test results that, in order to sufficiently reduce noise level, it is best for Le to be 2 mm to 15 mm and for Le/B to be 0.10 to 0.75.

TEST EXAMPLE 20

The pneumatic tire of Conventional Example 1 and pneumatic tires of Examples 46 to 50, to which the invention was applied, were prepared, and a test was conducted in the same manner as in Test Example 10.

In Test Example 20, a test was conducted in a manner similar to Test Example 10 with respect to a tire provided with the tread pattern (monopitch) shown in FIG. 14.

Tires of Examples 46 to 50 tires having a chamfered portion formed at the trailing side of the shoulder block, as shown in FIG. 20, with Ld being fixed at 6 mm, Lc being fixed at 12 mm, Le being fixed at 7 mm, Hb being fixed at 0.5 mm, and the dimension Lf being varied.

Figures 28A, 28B:
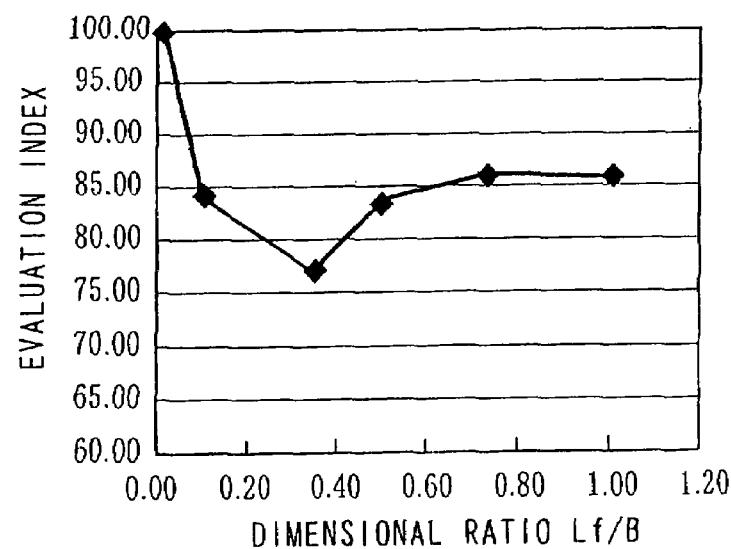
FIGS. 28A and 28B are the results of Test Example 11.

Dimensions and ratios, and the evaluation, were as listed in FIG. 28.

It will be understood from the test results that, in order to sufficiently reduce noise level, it is best for Lf to be 2 mm or greater and for Lf/B to be 0.10 or greater.

TEST EXAMPLE 21

The pneumatic tire of Conventional Example 2 and a pneumatic tire of Example 51, to which the invention was applied, were prepared, and a test was conducted in the same manner as in Test Example 10.

Figure 29A:
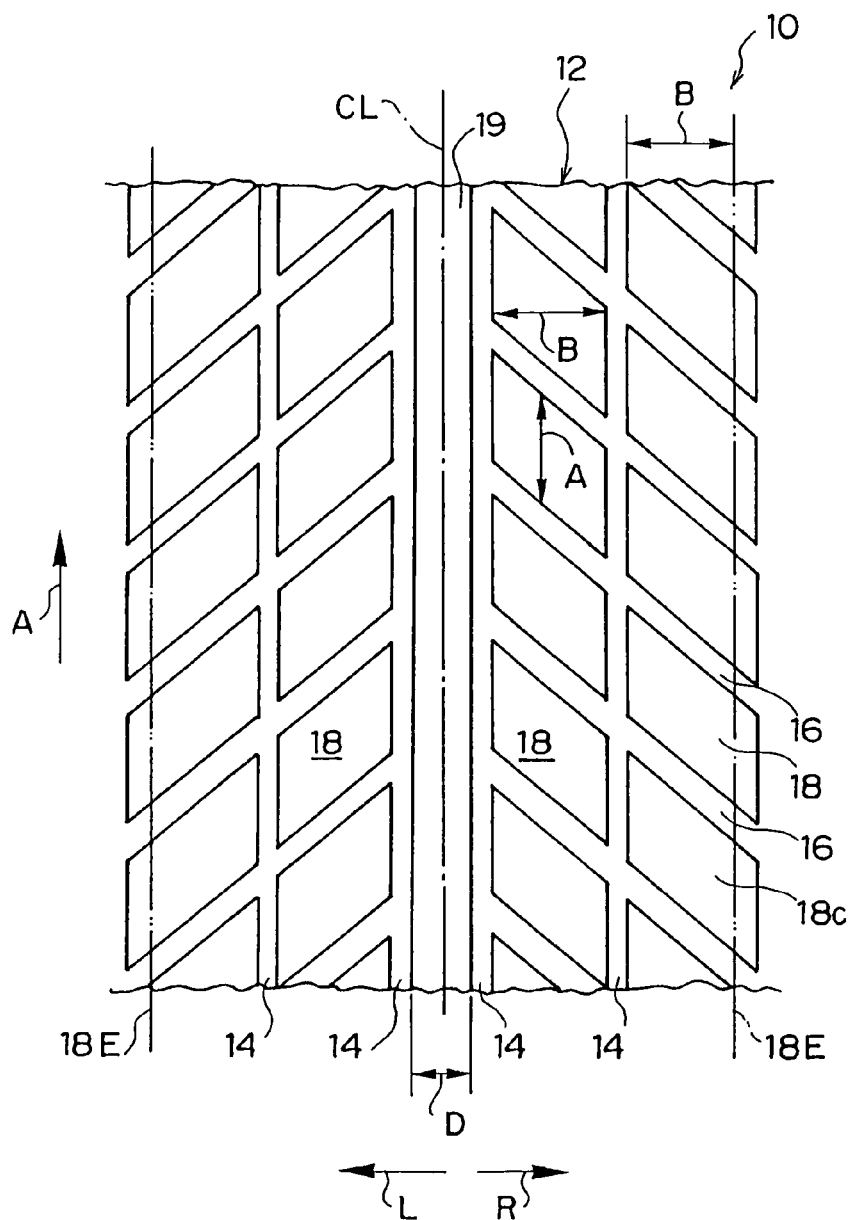
FIG. 29A is a plan view of a tread of a pneumatic tire of Test Example 12.

In Test Example 21, a test was conducted in a manner similar to Test Examples 10 and 11 with respect to a tire provided with the tread pattern shown in FIG. 29A.

The size of the tires was 195/65R14.

As for the size of blocks 18, dimension A was 30 mm, dimension B was 25 mm, and the height was 10 mm. Regarding the shoulder block 18c, the width of the ground-contacting region thereof corresponded to the dimension B (25 mm).

Lug grooves 16 were slanted at 40° with respect to the tire widthwise direction.

A width D of a rib 19 on the tire equatorial plane CL was 13 mm.

Tires of Conventional Example 2 a tire in which the tread surface of the shoulder blocks 18c was flat (along the tire outer contour configuration) and having no chamfered portion formed on the shoulder blocks 18c.

Figure 29B:
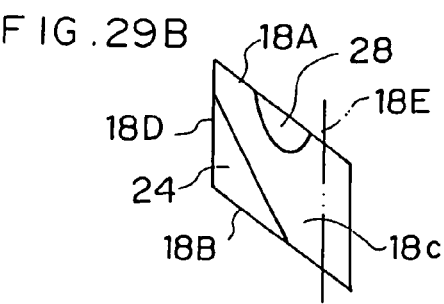
FIG. 29B is a plan view of a shoulder block of a tire of Example 51.

Tire of Example 51 a tire having a first chamfered portion 24 formed at the trailing side corner of the end edge 18D on the tire equatorial plane side of the shoulder block 18c and a second chamfered portion 28 formed at the leading edge, as shown in FIG. 29B.

Dimensions and ratios, and the evaluation, were as listed below in Table 20.

TABLE 20

| | | |
|---|---|---|
| Dimension | A | 30 mm |
| | B | 25 mm |
| | C | 10 mm |
| | Ha | 0.5 mm |
| | Hb | 0.5 mm |
| | La | 18.75 mm |
| | Lb | 25 mm |
| | Lc | 12 mm |
| | Ld | 7.5 mm |
| | Le | 8.75 mm |
| | Lf | 8.75 mm |
| Ratio | Ha/C | 0.05 |
| | Hb/C | 0.05 |
| | La/B | 0.75 |

TABLE 20-continued

| | |
|---|---|
| Lb/A | 0.83 |
| Lc/A | 0.4 |
| Ld/B | 0.3 |
| Le/B | 0.35 |
| Lf/B | 0.35 |

The test results are shown in Table 21 below, and it will be understood that there arise superior effects by the configuration of the present invention as described above, in a tire of a pattern where the lug grooves are slanted with respect to the tire widthwise direction.

TABLE 21

| | Noise Level |
|---|---|
| Conventional Example 2 | 100 |
| Example 51 | 81 |

INDUSTRIAL APPLICABILITY

As described above, the pneumatic tire relating to the present invention is suitable for use in automobiles and suitable for reducing tire noise without compromising other characteristics.

What is claimed is:

1. A pneumatic tire including a tread having plural blocks divided by plural grooves that mutually intersect, characterized in that:
    each of leading side edges and trailing side edges of the blocks has a height that changes in a tire widthwise direction;
    a portion of the leading side edge that initially contacts a road surface being a first highland portion which is positioned on a tire radial-direction outer side than the remaining portion of the leading side edge that later contacts the road surface; and
    a portion of the trailing side edge that lastly separates from a road surface being a second highland portion which is positioned on a tire radial-direction outer side than the remaining portion of the trailing side edge that initially separates from the road surface,
    wherein the first highland portion and the second highland portion are connected to each other and extend continuously in a tire circumferential direction and the position of the highland portion in the tire widthwise-direction is changed in the tire circumferential direction, and each edge, in the tire widthwise direction, of each block comprises a convex surface that is smoothly chamfered along the tire circumferential direction over at least a portion of each edge and defines a line edge at the top of a block sidewall, such that the first highland portion reaches a corner of the leading side edge, which corner initially contacts a road surface, and the second highland portion reaches a corner of the trailing side edge, which corner lastly separates from a road surface.

2. The pneumatic tire of claim 1, wherein when the blocks are viewed in cross section along the tire widthwise direction, the highland portions and the portions lower than the highland portions are provided in any portions at tire circumferential-direction positions.

3. The pneumatic tire of claim 1, wherein in a tread surface of the blocks, the highland portions include flat portions that coincide with an outer contour configuration of the tire.

4. The pneumatic tire of claim 3, wherein in the block edges in the tire circumferential direction, a tire widthwise-direction dimension of the flat portion is in a range of 3 mm to 15 mm (inclusive of 3 mm and 15 mm).

5. The pneumatic tire of claim 3, wherein in the block edges in the tire circumferential direction, the tire widthwise-direction dimension of the flat portion is 0.15 to 0.75 times a tire widthwise-direction dimension of the block edges.

6. The pneumatic tire of claim 1, wherein in the block edges in the tire circumferential direction, a depth dimension in a block height direction from a highest portion of the highland portion to a lowest portion of the tread surface is within a range of 0.1 mm to 2.5 mm (inclusive of 0.1 mm and 2.5 mm).

7. The pneumatic tire of claim 1, wherein in the block edges in the tire circumferential direction, the depth dimension in the block height direction from the highest portion of the highland portion to the lowest portion of the tread surface is 0.01 to 0.25 times a maximum height of the highland portion.

8. The pneumatic tire of claim 1, wherein in the block edges in the tire circumferential direction, a tire widthwise-direction length of the portions lower than the highland portions is 5 mm to 17 mm (inclusive of 5 mm and 17 mm).

9. The pneumatic tire of claim 1, wherein in the block edges in the tire circumferential direction, the tire widthwise-direction length of the portions lower than the highland portions is 0.25 to 0.85 times the tire widthwise-direction dimension of the block edges.

10. The pneumatic tire of claim 1, wherein in the block edges in the tire circumferential-direction of blocks disposed at places other than on a tire equatorial plane of the tread, highland portions are disposed at a tire equatorial plane side.

* * * * *